US007698135B2

(12) United States Patent
Murashima

(10) Patent No.: US 7,698,135 B2
(45) Date of Patent: Apr. 13, 2010

(54) VOICE DETECTING METHOD AND APPARATUS USING A LONG-TIME AVERAGE OF THE TIME VARIATION OF SPEECH FEATURES, AND MEDIUM THEREOF

(75) Inventor: Atsushi Murashima, Tokyo (JP)

(73) Assignee: NEC Corporation, Tokyo (JP)

( * ) Notice: Subject to any disclaimer, the term of this patent is extended or adjusted under 35 U.S.C. 154(b) by 343 days.

(21) Appl. No.: 11/501,958

(22) Filed: Aug. 10, 2006

(65) Prior Publication Data

US 2006/0271363 A1 Nov. 30, 2006

Related U.S. Application Data

(63) Continuation of application No. 09/871,368, filed on May 31, 2001, now Pat. No. 7,117,150.

(30) Foreign Application Priority Data

Jun. 2, 2000 (JP) ............................ 2000-166746

(51) Int. Cl.
*G10L 15/20* (2006.01)

(52) U.S. Cl. ...................................................... 704/233

(58) Field of Classification Search .................. 704/233
See application file for complete search history.

(56) References Cited

U.S. PATENT DOCUMENTS 5,007,093 A 4/1991 Thomson (Continued)

FOREIGN PATENT DOCUMENTS

JP 61-27598 2/1986

OTHER PUBLICATIONS

Joseph Pencak, et al., "The NP Speech Activity Detection Algorithm", Acoustics, Speech, and Signal Processing, Department of Defense, pp. 381-384 (1995).

"A Silence Compression Scheme for G.729 Optimized for Terminals Conforming to ITU-T V.70", ITU, International Telecommunication Union, Telecommunication Standardization Sector of ITU, Annex B (1996).

(Continued)

*Primary Examiner*—Michael N Opsasnick
(74) *Attorney, Agent, or Firm*—Scully, Scott, Murphy & Presser, P.C.

(57) ABSTRACT

A first filter (2061 in FIG. 1) calculates a long-time average of first change quantities based on a difference between a line spectral frequency of an input voice signal and a long-time average thereof. A second filter (2062 in FIG. 1) calculates a long-time average of second change quantities based on a difference between a whole band energy of the input voice signal and a long-time average thereof. A third filter (2063 in FIG. 1) calculates a long-time average of third change quantities based on a difference between a low band energy of the input voice signal and a long-time average thereof. A fourth filter (2064 in FIG. 1) calculates a long-time average of fourth change quantities based on a difference between a zero cross number of the input voice signal and a long-time average thereof. A voice/non-voice determining circuit (1040 in FIG. 1) discriminates a voice section from a non-voice section in the voice signal using the long-time average of the above-described first change quantities, the long-time average of the above-described second change quantities, the long-time average of the above-described third change quantities, and the long-time average of the above-described fourth change quantities.

10 Claims, 14 Drawing Sheets

U.S. PATENT DOCUMENTS

| | | | | |
|---|---|---|---|---|
| 5,568,514 | A | 10/1996 | McCree et al. | |
| 5,806,038 | A | 9/1998 | Huang et al. | |
| 5,911,128 | A * | 6/1999 | DeJaco | 704/200.1 |
| 6,088,670 | A * | 7/2000 | Takada | 704/233 |
| 6,438,518 | B1 * | 8/2002 | Manjunath et al. | 704/219 |

OTHER PUBLICATIONS

Dirk Van Compernolle, "Switching Adaptive Filters for Enhancing Noisy and Reverberant Speech from Michrophone Array Recordings", IEEE, pp. 833-836 (1990).

* cited by examiner

VOICE DETECTING METHOD AND APPARATUS USING A LONG-TIME AVERAGE OF THE TIME VARIATION OF SPEECH FEATURES, AND MEDIUM THEREOF

CROSS REFERENCE TO RELATED PATENTS

The present application is a continuation application of U.S. application Ser. No. 09/871,368, filed May 31, 2001, now U.S. Pat. No. 7,117,150 which issued on Oct. 3, 2006.

BACKGROUND OF THE INVENTION

The present invention relates to a voice detecting method and apparatus which are used in switching a coding method to a decoding method between a voice section and a non-voice section in a coding device and a decoding device for transmitting a voice signal at a low bit rate.

In mobile voice communication such as a mobile phone, a noise exists in a background of conversation voice, and however, it is considered that a bit rate necessary for transmission of a background noise in a non-voice section is lower compared with voice. Accordingly, from a use efficiency improvement standpoint for a circuit, there are many cases in which a voice section is detected, and a coding method specific to a background noise, which has a low bit rate, is used in the non-voice section. For example, in an ITU-T standard G.729 voice coding method, less information on a background noise is intermittently transmitted in the non-voice section. At this time, a correct operation is required for voice detection so that deterioration of voice quality is avoided and a bit rate is effectively reduced. Here, as a conventional voice detecting method, for example, "A Silence Compression Scheme for G.729 Optimized for Terminals Conforming to ITU-T V.70" (ITU-T Recommendation G.729, Annex B) (Referred to as "Literature 1") or a description in a paragraph B.3 (a detailed description of a VAD algorithm) of "A Silence Compression Scheme for standard JT-G729 Optimized for ITU-T Recommendation V.70 Terminals" (Telegraph Telephone Technical Committee Standard JT-G729, Annex B) (Referred to as "Literature 2") or "ITU-T Recommendation G.729 Annex B: A Silence Compression Scheme for Use with G.729 Optimized for V.70 Digital Simultaneous Voice and Data Applications" (IEEE Communication Magazine, pp. 64-73, September 1997) (Referred to as "Literature 3") is referred to.

FIG. 6 is a block diagram showing an arrangement example of a conventional voice detecting apparatus. It is assumed that an input of voice to this voice detecting apparatus is conducted at a block unit (frame) of a $T_{fr}$ msec (for example, 10 msec) period. A frame length is assumed to be $L_{fr}$ samples (for example, 80 samples). The number of samples for one frame is determined by a sampling frequency (for example, 8 kHz) of input voice.

Referring to FIG. 5, each constitution element of the conventional voice detecting apparatus will be explained.

Voice is input from an input terminal 10, and a linear predictive coefficient is input from an input terminal 11. Here, the linear predictive coefficient is obtained by applying linear predictive analysis to the above-described input voice vector in a voice coding device in which the voice detecting apparatus is used. With regard to the linear predictive analysis, a well-known method, for example, Chapter 8 "Linear Predictive Coding of Speech" in "Digital Processing of Speech Signals" (Prentice-Hall, 1978) (Referred to as "Literature 4") by L. R. Rabiner, et al. can be referred to. In addition, in case that the voice detecting apparatus in accordance with the present invention is realized independent of the voice coding device, the above-described linear predictive analysis is performed in this voice detecting apparatus.

An LSF calculating circuit 1011 receives the linear predictive coefficient via the input terminal 11, and calculates a line spectral frequency (LSF) from the above-described linear predictive coefficient, and outputs the above-described LSF to a first change quantity calculating circuit 1031 and a first moving average calculating circuit 1021. Here, with regard to the calculation of the LSF from the linear predictive coefficient, a well-known method, for example, a method and so forth described in Paragraph 3.2.3 of the Literature 1 are used.

A whole band energy calculating circuit 1012 receives voice (input voice) via the input terminal 10, and calculates a whole band energy of the input voice, and outputs the above-described whole band energy to a second change quantity calculating circuit 1032 and a second moving average calculating circuit 1022. Here, the whole band energy $E_f$ is a logarithm of a normalized zero-degree autocorrelation function R(0), and is represented by the following equation:

$$E_f = 10 \cdot \log_{10}\left[\frac{1}{N}R(0)\right]$$

Also, an autocorrelation coefficient is represented by the following equation:

$$R(k) = \sum_{n=k}^{N-1} s^1(n)s^1(n-k)$$

Here, N is a length (analysis window length, for example, 240 samples) of a window of the linear predictive analysis for the input voice, and $S^1(n)$ is the input voice multiplied by the above-described window.

In case of $N>L_{fr}$, by holding the voice which was input in the past frame, it shall be voice for the above-described analysis window length.

A low band energy calculating circuit 1013 receives voice (input voice) via the input terminal 10, and calculates a low band energy of the input voice, and outputs the above-described low band energy to a third change quantity calculating circuit 1033 and a third moving average calculating circuit 1023. Here, the low band energy $E_l$ from 0 to $F_l$ Hz is represented by the following equation:

$$E_l = 10 \cdot \log_{10}\left[\frac{1}{N}\hat{h}^T \hat{R}\hat{h}\right]$$

Here, $\hat{h}$ is an impulse response of an FIR filter, a cutoff frequency of which is $F_1$ Hz, and $\hat{R}$ is a Teplitz autocorrelation matrix, diagonal components of which are autocorrelation coefficients R(k).

A zero cross number calculating circuit 1014 receives voice (input voice) via the input terminal 10, and calculates a zero cross number of an input voice vector, and outputs the above-described zero cross number to a fourth change quantity calculating circuit 1034 and a fourth moving average calculating circuit 1024. Here, the zero cross number $Z_c$ is represented by the following equation:

$$Z_c = \frac{1}{2L_{fr}} \sum_{n=0}^{L_{fr}-1} |sgn[s(n)] - sgn[s(n-1)]|$$

Here, S(n) is the input voice, and sgn[x] is a function which is 1 when x is a positive number and which is 0 when it is a negative number.

The first moving average calculating circuit 1021 receives the LSF from the LSF calculating circuit 1011, and calculates an average LSF in the current frame (present frame) from the above-described LSF and an average LSF calculated in the past frames, and outputs it to the first change quantity calculating circuit 1031. Here, if an LSF in the m-th frame is assumed to be $$\omega_i^{[m]},\ i=1, \ldots, P$$

an average LSF in the m-th frame $$\overline{\omega}_i^{[m]},\ i=1, \ldots, P$$

is represented by the following equation:

$$\overline{\omega}_i^{[m]}=\beta_{LSF}\cdot\overline{\omega}_i^{[m-1]}+(1-\beta_{LSF})\cdot\omega_i^{[m]},\ i=1, \ldots, P$$

Here, P is a linear predictive order (for example, 10), and $\beta_{LSF}$ is a certain constant number (for example, 0.7).

The second moving average calculating circuit 1022 receives the whole band energy from the whole band energy calculating circuit 1012, and calculates an average whole band energy in the current frame from the above-described whole band energy and an average whole band energy calculated in the past frames, and outputs it to the second change quantity calculating circuit 1032. Here, assuming that a whole band energy in the m-th frame is $E_f^{[m]}$, an average whole band energy in the m-th frame $$\overline{E}_f^{[m]}$$

is represented by the following equation:

$$\overline{E}_f^{[m]}=\beta_{Ef}\cdot\overline{E}_f^{[m-1]}+(1-\beta_{Ef})\cdot E_f^{[m]}$$

Here, $\beta_{Ef}$ is a certain constant number (for example, 0.7).

The third moving average calculating circuit 1023 receives the low band energy from the low band energy calculating circuit 1013, and calculates an average low band energy in the current frame from the above-described low band energy and an average low band energy calculated in the past frames, and outputs it to the third change quantity calculating circuit 1033. Here, assuming that a low band energy in the m-th frame is $E_l^{[m]}$, an average low band energy in the m-th frame $$\overline{E}_l^{[m]}$$

is represented by the following equation:

$$\overline{E}_l^{[m]}=\beta_{El}\cdot\overline{E}_l^{[m-1]}+(1-\beta_{El})\cdot E_l^{[m]}$$

Here, $\beta_{El}$ is a certain constant number (for example, 0.7).

The fourth moving average calculating circuit 1024 receives the zero cross number from the zero cross number calculating circuit 1014, and calculates an average zero cross number in the current frame from the above-described zero cross number and an average zero cross number calculated in the past frames, and outputs it to the fourth change quantity calculating circuit 1034. Here, assuming that a zero cross number in the m-th frame is $Z_c^{[m]}$, an zero cross number in the m-th frame $$\overline{Z}_c^{[m]}$$

is represented by the following equation:

$$\overline{Z}_c^{[m]}=\beta_{Zc}\cdot\overline{Z}_c^{[m-1]}+(1-\beta_{Zc})\cdot Z_c^{[m]}$$

Here, $\beta_{Zc}$ is a certain constant number (for example, 0.7).

The first change quantity calculating circuit 1031 receives LSF $\omega_i^{[m]}$ from the LSF calculating circuit 1011, and receives the average LSF $$\overline{\omega}_i^{[m]}$$

from the first moving average calculating circuit 1021, and calculates spectral change quantities (first change quantities) from the above-described LSF and the above-described average LSF, and outputs the above-described first change quantities to a voice/non-voice determining circuit 1040. Here, the first change quantities $\Delta S^{[m]}$ in the m-th frame are represented by the following equation:

$$\Delta S^{[m]} = \sum_{i=1}^{P} (\omega_i^{[m]} - \overline{\omega}_i^{[m]})^2$$

The second change quantity calculating circuit 1032 receives the whole band energy $E_f^{[m]}$ from the whole band energy calculating circuit 1012, and receives the average whole band energy $$\overline{E}_f^{[m]}$$

from the second moving average calculating circuit 1022, and calculates whole band energy change quantities (second change quantities) from the above-described whole band energy and the above-described average whole band energy, and outputs the above-described second change quantities to the voice/non-voice determining circuit 1040. Here, the second change quantities $\Delta E_f^{[m]}$ in the m-th frame are represented by the following equation:

$$\Delta E_f^{[m]}=\overline{E}_f^{[m]}-E_f^{[m]}$$

The third change quantity calculating circuit 1033 receives the low band energy $E_l^{[m]}$ from the low band energy calculating circuit 1013, and receives the average low band energy $$\overline{E}_l^{[m]}$$

from the third moving average calculating circuit 1023, and calculates low band energy change quantities (third change quantities) from the above-described low band energy and the above-described average low band energy, and outputs the above-described third change quantities to the voice/non-voice determining circuit 1040. Here, the third change quantities $\Delta E_l^{[m]}$ in the m-th frame are represented by the following equation:

$$\Delta E_l^{[m]}=\overline{E}_1^{[m]}-E_l^{[m]}$$

The fourth change quantity calculating circuit 1034 receives the zero cross number $Z_c^{[m]}$ from the zero cross number calculating circuit 1014, and receives the zero cross number $$\overline{Z}_c^{[m]}$$

from the fourth moving average calculating circuit 1024, and calculates zero cross number change quantities (fourth change quantities) from the above-described zero cross number and the above-described average zero cross number, and outputs the above-described fourth change quantities to the voice/non-voice determining circuit 1040. Here, the fourth change quantities $\Delta Z_c^{[m]}$ in the m-th frame are represented by the following equation:

$$\Delta Z_c^{[m]} = \bar{Z}_c^{[m]} - Z_c^{[m]}$$

The voice/non-voice determining circuit 1040 receives the first change quantities from the first change quantity calculating circuit 1031, receives the second change quantities from the second change quantity calculating circuit 1032, receives the third change quantities from the third change quantity calculating circuit 1033, and receives the fourth change quantities from the fourth change quantity calculating circuit 1034, and the voice/non-voice determining circuit determines that it is a voice section when a four-dimensional vector consisting of the above-described first change quantities, the above-described second change quantities, the above-described third change quantities and the above-described fourth change quantities exists within a voice region in a four-dimensional space, and otherwise, the voice/non-voice determining circuit determines that it is a non-voice section, and sets a determination flag to 1 in case of the above-described voice section, and sets the determination flag to 0 in case of the above-described non-voice section, and outputs the above-described determination flag to a determination value smoothing circuit 1050. For the determination of the voice and the non-voice (voice/non-voice determination), for example, 14 kinds of boundary determination described in Paragraph B.3.5 of the Literatures 1 and 2 can be used.

The determination value correcting circuit 1050 receives the determination flag from the voice/non-voice determining circuit 1040, and receives the whole band energy from the whole band energy calculating circuit 1012, and corrects the above-described determination flag in accordance with a predetermined condition equation, and outputs the corrected determination flag via the output terminal. Here, the correction of the above-described determination flag is conducted as follows: If a previous frame is a voice section (in other words, the determination flag is 1), and if the energy of the current frame exceeds a certain threshold value, the determination flag is set to 1. Also, if two frames including the previous frame are continuously the voice section, and if an absolute value of a difference between the energy of the current frame and the energy of the previous frame is less than a certain threshold value, the determination flag is set to 1. On the other hand, if past ten frames are non-voice sections (in other wards, the determination flag is 0), and if a difference between the energy of the current frame and the energy of the previous frame is less than a certain threshold value, the determination flag is set to 0. For the correction of the determination flag, for example, a condition equation described in Paragraph B.3.6 of the Literatures 1 and 2 can be used.

The above-mentioned conventional voice detecting method has a task that there is a case in which a detection error in the voice section (to erroneously detect a non-voice section for a voice section) and a detection error in the non-voice section (to erroneously detect a voice section for a non-voice section) occur.

The reason thereof is that the voice/non-voice determination is conducted by directly using the change quantities of spectrum, the change quantities of energy and the change quantities of the zero cross number. Even though actual input voice is the voice section, since a value of each of the above-described change quantities has a large change, the actual input voice does not always exist in a value range predetermined in accordance with the voice section. Accordingly, the above-described detection error in the voice section occurs. This is the same as in the non-voice section.

SUMMARY OF THE INVENTION

The present invention is made to solve the above-mentioned problems.

The first invention of the present application is a voice detecting method of discriminating a voice section from a non-voice section for every fixed time length for a voice signal, using feature quantity calculated from the above-described voice signal input for every fixed time length, and it is characterized in that a long-time average of change quantities obtained by inputting change quantities of the feature quantity to filters is used.

The second invention of the present application is characterized in that, in the first invention, the change quantities of the above-described feature quantity are calculated by using the above-described feature quantity and a long-time average thereof.

The third invention of the present application is characterized in that, in the first or second invention, the above-described filters are switched to each other when the long-time average of the above-described change quantities is calculated, using a result of the above-described discrimination output in the past in accordance with the above-described voice detecting method.

The fourth invention of the present application is characterized in that, in the first, second or third invention, the feature quantity calculated from the above-described voice signal input in the past is used.

The fifth invention of the present application is characterized in that, in the first, second, third or fourth invention, at least one of a line spectral frequency, a whole band energy, a low band energy and a zero cross number is used for the above-described feature quantity.

The sixth invention of the present invention is characterized in that, in the fifth invention, at least one of a line spectral frequency that is calculated from a linear predictive coefficient decoded by means of a voice decoding method, a whole band energy, a low band energy and a zero cross number that are calculated from a regenerative voice signal output in the past by means of the above-described voice decoding method is used.

The seventh invention of the present application is a voice detecting apparatus for discriminating a voice section from a non-voice section for every fixed time length for a voice signal, using feature quantity calculated from the above-described voice signal input for every fixed time length, and it is characterized in that the apparatus includes: an LSF calculating circuit for calculating a line spectral frequency (LSF) from the above-described voice signal; a whole band energy calculating circuit for calculating a whole band energy from the above-described voice signal; a low band energy calculating circuit for calculating a low band energy from the above-described voice signal; a zero cross number calculating circuit for calculating a zero cross number from the above-described voice signal; a line spectral frequency change quantity calculating section for calculating change quantities (first change quantities) of the above-described line spectral frequency; a whole band energy change quantity calculating section for calculating change quantities (second change quantities) of the above-described whole band energy; a low band energy change quantity calculating section for calculating change quantities (third change quantities) of above-described low band energy; a zero cross number change quantity calculating section for calculating change quantities (fourth change quantities) of the above-described zero cross number; a first filter for calculating a long-time average of the above-described first change quantities; a second filter for calculating a long-time average of the above-described second change quantities; a third filter for calculating a long-time average of the above-described third change quantities; and a fourth filter for calculating a long-time average of the above-described fourth change quantities.

The eighth invention of the present application is a voice detecting apparatus for discriminating a voice section from a non-voice section for every fixed time length for a voice signal, using feature quantity calculated from the above-described voice signal input for every fixed time length, and it is characterized in that the apparatus includes: a LSF calculating circuit for calculating a line spectral frequency (LSF) from the above-described voice signal; a whole band energy calculating circuit for calculating a whole band energy from the above-described voice signal; a low band energy calculating circuit for calculating a low band energy from the above-described voice signal; a zero cross number calculating circuit for calculating a zero cross number from the above-described voice signal; a first change quantity calculating section for calculating first change quantities based on a difference between the above-described line spectral frequency and a long-time average thereof; a second change quantity calculating section for calculating second change quantities based on a difference between the above-described whole band energy and a long-time average thereof; a third change quantity calculating section for calculating third change quantities based on a difference between the above-described low band energy and a long-time average thereof; a fourth change quantity calculating section for calculating fourth change quantities based on a difference between the above-described zero cross number and a long-time average thereof; a first filter for calculating a long-time average of the above-described first change quantities; a second filter for calculating a long-time average of the above-described second change quantities; a third filter for calculating a long-time average of the above-described third change quantities; and a fourth filter for calculating a long-time average of the above-described fourth change quantities.

The ninth invention of the present application is characterized in that, in the seventh or eighth invention, the apparatus includes: a first storage circuit for holding a result of the above-described discrimination, which was output in the past from the above-described voice detecting apparatus; a first switch for switching a fifth filter to a sixth filter using the result of the above-described discrimination, which is input from the above-described first storage circuit, when the long-time average of the above-described first change quantities is calculated; a second switch for switching a seventh filter to an eighth filter using the result of the above-described discrimination, which is input from the above-described first storage circuit, when the long-time average of the above-described second change quantities is calculated; a third switch for switching a ninth filter to a tenth filter using the result of the above-described discrimination, which is input from the above-described first storage circuit, when the long-time average of the above-described third change quantities is calculated; and a fourth switch for switching an eleventh filter to a twelfth filter using the result of the above-described discrimination, which is input from the above-described first storage circuit, when the long-time average of the above-described fourth change quantities is calculated.

The tenth invention of the present application is characterized in that, in the seventh, eighth or ninth invention, the above-described line spectral frequency, the above-described whole band energy, the above-described low band energy and the above-described zero cross number are calculated from the above-described voice signal input in the past.

The eleventh invention of the present application is characterized in that, in any of the seventh to tenth inventions, at least one of the line spectral frequency, the whole band energy, the low band energy and the zero cross number is used for the feature quantity.

The twelfth invention of the present application is characterized in that, in any of the seventh to tenth inventions, the apparatus includes a second storage circuit for storing and holding a regenerative voice signal output from a voice decoding device in the past, and uses at least one of a whole band energy, a low band energy and a zero cross number that are calculated from the above-described regenerative voice signal output from the above-described second storage circuit, and a line spectral frequency that is calculated from a linear predictive coefficient decoded in the above-described voice decoding device.

The thirteenth invention of the present application provides a recording medium in which a program for executing a voice detecting method of discriminating a voice section from a non-voice section for every fixed time length for a voice signal, using feature quantity calculated from the above-described voice signal input for every fixed time length, is recorded for making a computer execute processes (a) to (l): (a) a process of calculating a line spectral frequency (LSF) from the above-described voice signal; (b) a process of calculating a whole band energy from the above-described voice signal; (c) a process of calculating a low band energy from the above-described voice signal; (d) a process of calculating a zero cross number from the above-described voice signal; (e) a process of calculating change quantities (first change quantities) of the above-described line spectral frequency; (f) a process of calculating change quantities (second change quantities) of the above-described whole band energy; (g) a process of calculating change quantities (third change quantities) of the above-described low band energy; (h) a process of calculating change quantities (fourth change quantities) of the above-described zero cross number; (I) a process of calculating a long-time average of the above-described first change quantities; (j) a process of calculating a long-time average of the above-described second change quantities; (k) a process of calculating a long-time average of the above-described third change quantities; and (l) a process of calculating a long-time average of the above-described fourth change quantities.

The fourteenth invention of the present application provides a recording medium in which a program for executing a voice detecting method of discriminating a voice section from a non-voice section for every fixed time length for a voice signal, using feature quantity calculated from the above-described voice signal input for every fixed time length, is recorded for making a computer execute processes (a) to (l): (a) a process of calculating a line spectral frequency (LSF) from the above-described voice signal; (b) a process of calculating a whole band energy from the above-described voice signal; (c) a process of calculating a low band energy from the above-described voice signal; (d) a process of calculating a zero cross number from the above-described voice signal; (e) a process of calculating first change quantities based on a difference between the above-described line spectral frequency and a long-time average thereof; (f) a process of calculating second change quantities based on a difference between the above-described whole band energy and a long-time average thereof; (g) a process of calculating third change quantities based on a difference between the above-described low band energy and a long-time average thereof; (h) a process of calculating fourth change quantities based on a difference between the above-described zero cross number and a long-time average thereof; (I) a process of calculating a long-time average of the above-described first change quantities; (j) a process of calculating a long-time average of the above-described second change quantities; (k) a process of calculating a long-time average of the above-described third change quantities; and (l) a process of calculating a long-time average of the above-described fourth change quantities.

In the thirteenth or fourteenth invention, the fifth invention of the present application provides a recording medium in which a program is recorded for making the above-described computer execute processes (a) to (e): (a) a process of holding a result of the above-described discrimination, which was output in the past; (b) a process of switching a fifth filter to a sixth filter using the result of the above-described discrimination, which is input from the above-described first storage circuit, when the long-time average of the above-described first change quantities is calculated; (c) a process of switching a seventh filter to an eighth filter using the result of the above-described discrimination, which is input from the above-described first storage circuit, when the long-time average of the above-described second change quantities is calculated; (d) a process of switching a ninth filter to a tenth filter using the result of the above-described discrimination, which is input from the above-described first storage circuit, when the long-time average of the above-described third change quantities is calculated; and (e) a process of switching an eleventh filter to a twelfth filter using the result of the above-described discrimination, which is input from the above-described first storage circuit, when the long-time average of the above-described fourth change quantities is calculated.

In the thirteenth, fourteenth or fifth invention, the sixteenth invention of the present application provides a recording medium in which a program is recorded for making the above-described computer execute a process of calculating the above-described line spectral frequency, the above-described whole band energy, the above-described low band energy and the above-described zero cross number from the above-described voice signal input in the past.

In any of the thirteenth to sixteenth inventions, the seventeenth invention of the present application provides a recording medium, which is readable by the above-described information processing device, in which a program is recorded for making the above-described information processing device execute at least one of processes (a) to (d): (a) a process of calculating a line spectral frequency (LSF) from the above-described voice signal; (b) a process of calculating a whole band energy from the above-described voice signal; (c) a process of calculating a low band energy from the above-described voice signal; and (d) a process of calculating a zero cross number from the above-described voice signal.

In any of the thirteenth to seventeenth inventions, the eighteenth invention of the present application provides a recording medium, which is readable by the above-described information processing device, in which a program is recorded for making the above-described information processing device execute (a) a process of storing and holding a regenerative voice signal output from a voice decoding device in the past, and at least one of processes (b) to (e): (b) a process of calculating a line spectral frequency (LSF) from the above-described regenerative voice signal; (c) a process of calculating a whole band energy from the above-described regenerative voice signal; (d) a process of calculating a low band energy from the above-described regenerative voice signal; and (e) a process of calculating a zero cross number from the above-described regenerative voice signal.

In the present invention, the voice/non-voice determination is conducted by using the long-time averages of the spectral change quantities, the energy change quantities and the zero cross number change quantities. Since, with regard to the long-time average of each of the above-described change quantities, a change of a value within each section of voice and non-voice is smaller compared with each of the above-described change quantities themselves, values of the above-described long-time averages exist with a high rate within a value range predetermined in accordance with the voice section and the non-voice section. Therefore, a detection error in the voice section and a detection error in the non-voice section can be reduced.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Next, embodiments of the present invention will be explained in detail referring to drawings.

Figure 1:
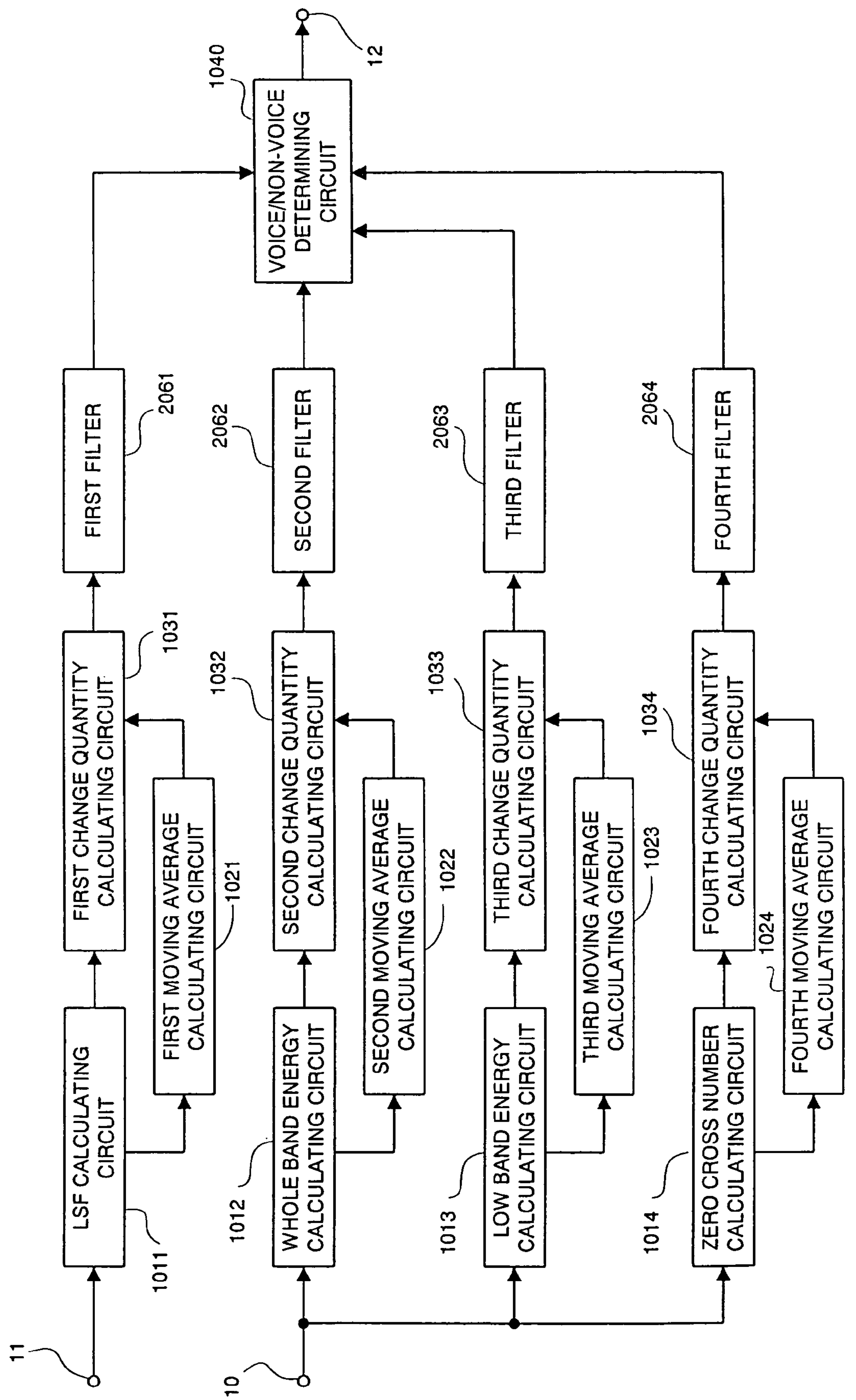
FIG. 1 is a block diagram showing the first embodiment of a voice detecting apparatus of the present invention.

FIG. 1 is a view showing an arrangement of a first embodiment of a voice detecting apparatus of the present invention. In FIG. 1, the same reference numerals are attached to elements same as or similar to those in FIG. 6. In FIG. 1, since input terminals 10 and 11, an output terminal 12, an LSF calculating circuit 1011, a whole band energy calculating circuit 1012, a low band energy calculating circuit 1013, a zero cross number calculating circuit 1014, a first moving average calculating circuit 1021, a second moving average calculating circuit 1022, a third moving average calculating circuit 1023, a fourth moving average calculating circuit 1024, a first change quantity calculating circuit 1031, a second change quantity calculating circuit 1032, a third change quantity calculating circuit 1033, a fourth change quantity calculating circuit 1034, and a voice/non-voice determining circuit 1040 are the same as the elements shown in FIG. 5, explanation of these elements will be omitted, and points different from the arrangement shown in FIG. 5 will be mainly explained below.

Figure 5:
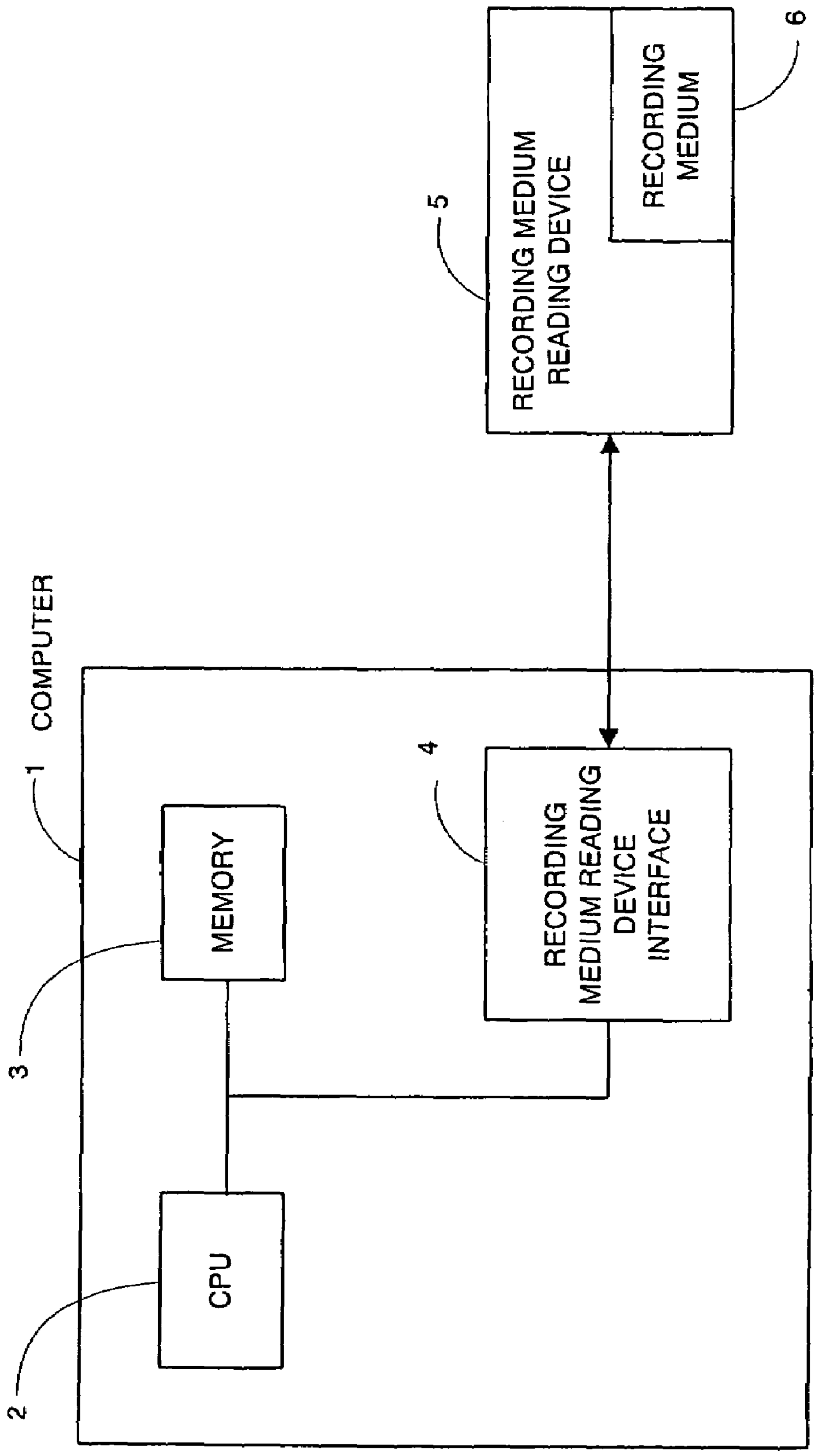
FIG. 5 is a block diagram showing the fifth embodiment of the present invention.
Figure 6:
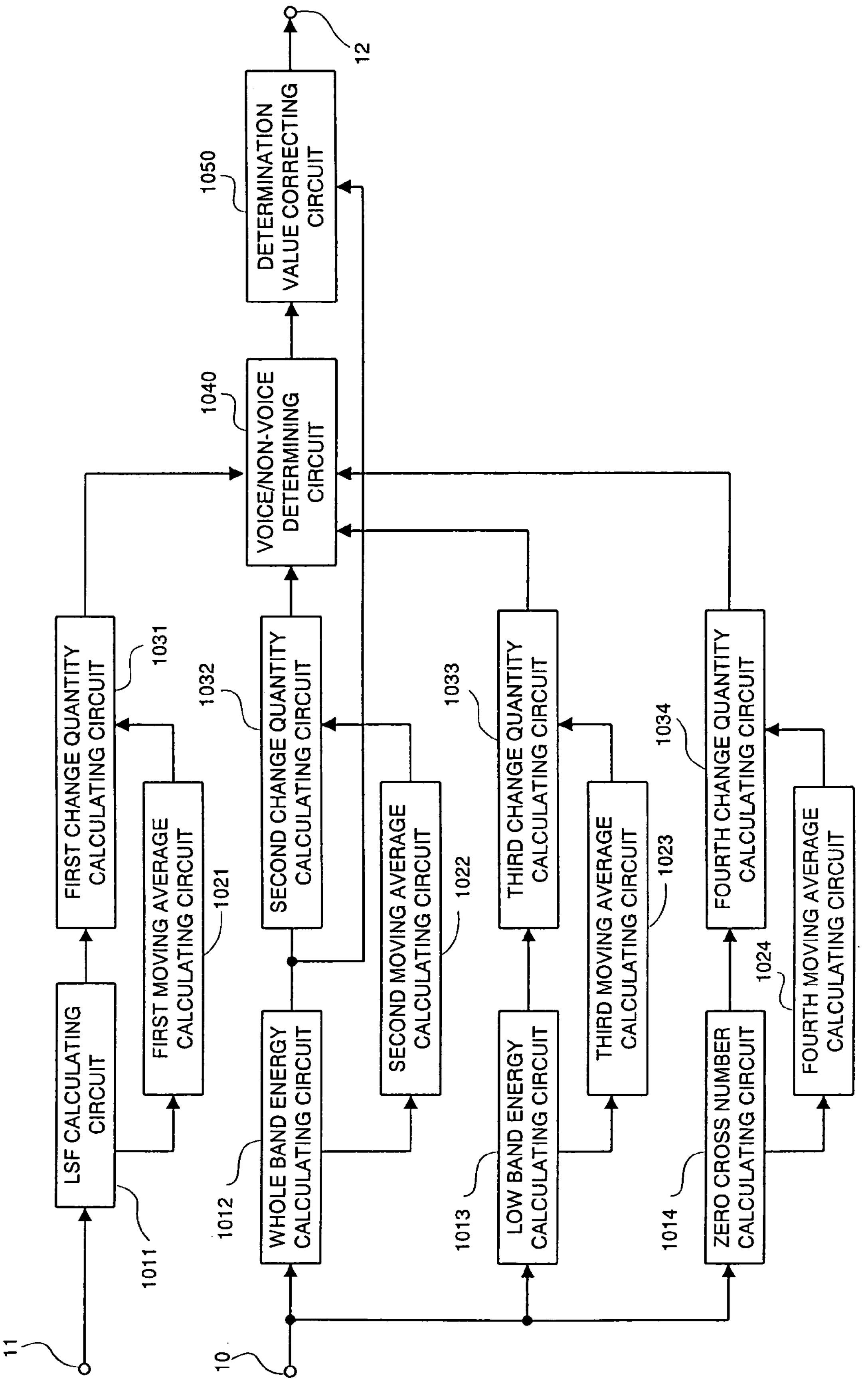
FIG. 6 is a block diagram showing a conventional voice detecting apparatus.

Referring to FIG. 1, in the first embodiment of the present invention, a first filter 2061, a second filter 2062, a third filter 2063 and a fourth filter 2064 are added to the arrangement shown in FIG. 5. In the first embodiment of the present invention, similar to the arrangement in FIG. 5, it is assumed that an input of voice is conducted at a block unit (frame) of a $T_{fr}$ msec (for example, 10 msec) period. A frame length is assumed to be $L_{fr}$ samples (for example, 80 samples). The number of samples for one frame is determined by a sampling frequency (for example, 8 kHz) of input voice.

The first filter 2061 receives the first change quantities from the first change quantity calculating circuit 1031, and calculates a first average change quantity that is a value in which average performance of the above-described first change quantities is reflected, such as an average value, a median value and a most frequent value of the above-described first change quantities, and outputs the above-described first average change quantity to the voice/non-voice determining circuit 1040. Here, for the calculation of the above-described average value, the median value or the most frequent value, a linear filter and a non-linear filter can be used.

Here, by using a smoothing filter of the following equation, from the first change quantities $\Delta S^{[m]}$ in the m-th frame and the first average change quantity $$\Delta\overline{S}^{[m-1]}$$

in the (m−1)-th frame, the first average change quantity $$\Delta\overline{S}^{[m]}$$

in the m-th frame is calculated.

$$\Delta\overline{S}^{[m]}=\gamma_S\cdot\Delta\overline{S}^{[m-1]}+(1-\gamma_S)\cdot\Delta S^{[m]}$$

Here, $\gamma_S$ is a constant number, and for example, $\gamma_S$=0.74.

The second filter 2062 receives the second change quantities from the second change quantity calculating circuit 1032, and calculates a second average change quantity that is a value in which average performance of the above-described second change quantities is reflected, such as an average value, a median value and a most frequent value of the above-described second change quantities, and outputs the above-described second average change quantity to the voice/non-voice determining circuit 1040. Here, for the calculation of the above-described average value, the median value or the most frequent value, a linear filter and a non-linear filter can be used.

Here, by using a smoothing filter of the following equation, from the second change quantities $\Delta E_f^{[m]}$ in the m-th frame and the second average change quantity $$\Delta\overline{E}_f^{[m-1]}$$

in the (m−1)-th frame, the second average change quantity $$\Delta\overline{E}_f^{[m]}$$

in the m-th frame is calculated.

$$\Delta\overline{E}_f^{[m]}=\gamma_{Ef}\cdot\Delta\overline{E}_f^{[m-1]}+(1-\gamma_{EF})\cdot\Delta E_f^{[m]}$$

Here, $\gamma_{Ef}$ is a constant number, and for example, $\gamma_{Ef}$=0.6.

The third filter 2063 receives the third change quantities from the third change quantity calculating circuit 1033, and calculates a third average change quantity that is a value in which average performance of the above-described third change quantities is reflected, such as an average value, a median value and a most frequent value of the above-described third change quantities, and outputs the above-described third average change quantity to the voice/non-voice determining circuit 1040. Here, for the calculation of the above-described average value, the median value or the most frequent value, a linear filter and a non-linear filter can be used.

Here, by using a smoothing filter of the following equation, from the third change quantities $\Delta E_l^{[m]}$ in the m-th frame and the third average change quantity $$\Delta\overline{E}_l^{[m-1]}$$

in the (m−1)-th frame, the third average change quantity $$\Delta\overline{E}_l^{[m]}$$

in the m-th frame is calculated.

$$\Delta\overline{E}_l^{[m]}=\gamma_{El}\cdot\Delta\overline{E}_l^{[m-1]}+(1-\gamma_{El})\cdot\Delta E_l^{[m]}$$

Here, $\gamma_{El}$ is a constant number, and for example, $\gamma_{El}$=0.6.

The fourth filter 2064 receives the fourth change quantities from the fourth change quantity calculating circuit 1034, and calculates a fourth average change quantity that is a value in which average performance of the above-described fourth change quantities is reflected, such as an average value, a median value and a most frequent value of the above-described fourth change quantities, and outputs the above-described fourth average change quantity to the voice/non-voice determining circuit 1040. Here, for the calculation of the above-described average value, the median value or the most frequent value, a linear filter and a non-linear filter can be used.

Here, by using a smoothing filter of the following equation, from the fourth change quantities $\Delta Z_c^{[m]}$ in the m-th frame and the fourth average change quantity $$\Delta\overline{Z}_c^{[m-1]}$$

in the (m−1)-th frame, the fourth average change quantity $$\Delta\overline{Z}_c^{[m]}$$

in the m-th frame is calculated.

$$\Delta\overline{Z}_c^{[m]}=\gamma_{Zc}\cdot\Delta\overline{Z}_c^{[m-1]}+(1-\gamma_{Zc})\cdot\Delta Z_c^{[m]}$$

Here, $\gamma_{Zc}$ is a constant number, and for example, $\gamma_{Zc}$=0.7.

In addition, instead of the equations shown in the conventional example, the first change quantities, the second change quantities, the third change quantities and the fourth change quantities calculated in the first change quantity calculating circuit 1031, the second change quantity calculating circuit 1032, the third change quantity calculating circuit 1033 and the fourth change quantity calculating circuit 1034 are also calculated by using the following equations, respectively:

$$\Delta S^{[m]}=\sum_{i=1}^{p}\frac{|\omega_i^{[m]}-\overline{\omega}_i^{[m]}|}{\overline{\omega}_i^{[m]}}$$

-continued $$\Delta E_f^{[m]} = \frac{|\overline{E}_f^{[m]} - E_f^{[m]}|}{\overline{E}_f^{[m]}}$$

$$\Delta E_l^{[m]} = \frac{|\overline{E}_l^{[m]} - E_l^{[m]}|}{\overline{E}_l^{[m]}}$$

$$\Delta Z_c^{[m]} = \frac{|\overline{Z}_c^{[m]} - Z_c^{[m]}|}{\overline{Z}_c^{[m]}}$$

This is the same for other embodiments described below.

Otherwise, the following equations can be used.

$$\Delta S^{[m]} = \sum_{i=1}^{P} \frac{(\omega_i^{[m]} - \varpi_i^{[m]})^2}{\varpi_i^{[m]}}$$

$$\Delta E_f^{[m]} = \frac{(\overline{E}_f^{[m]} - E_f^{[m]})^2}{\overline{E}_f^{[m]}}$$

$$\Delta E_l^{[m]} = \frac{(\overline{E}_l^{[m]} - E_l^{[m]})^2}{\overline{E}_l^{[m]}}$$

$$\Delta Z_c^{[m]} = \frac{(\overline{Z}_c^{M} - Z_c^{[m]})^2}{\overline{Z}_c^{[m]}}$$

Figure 2:
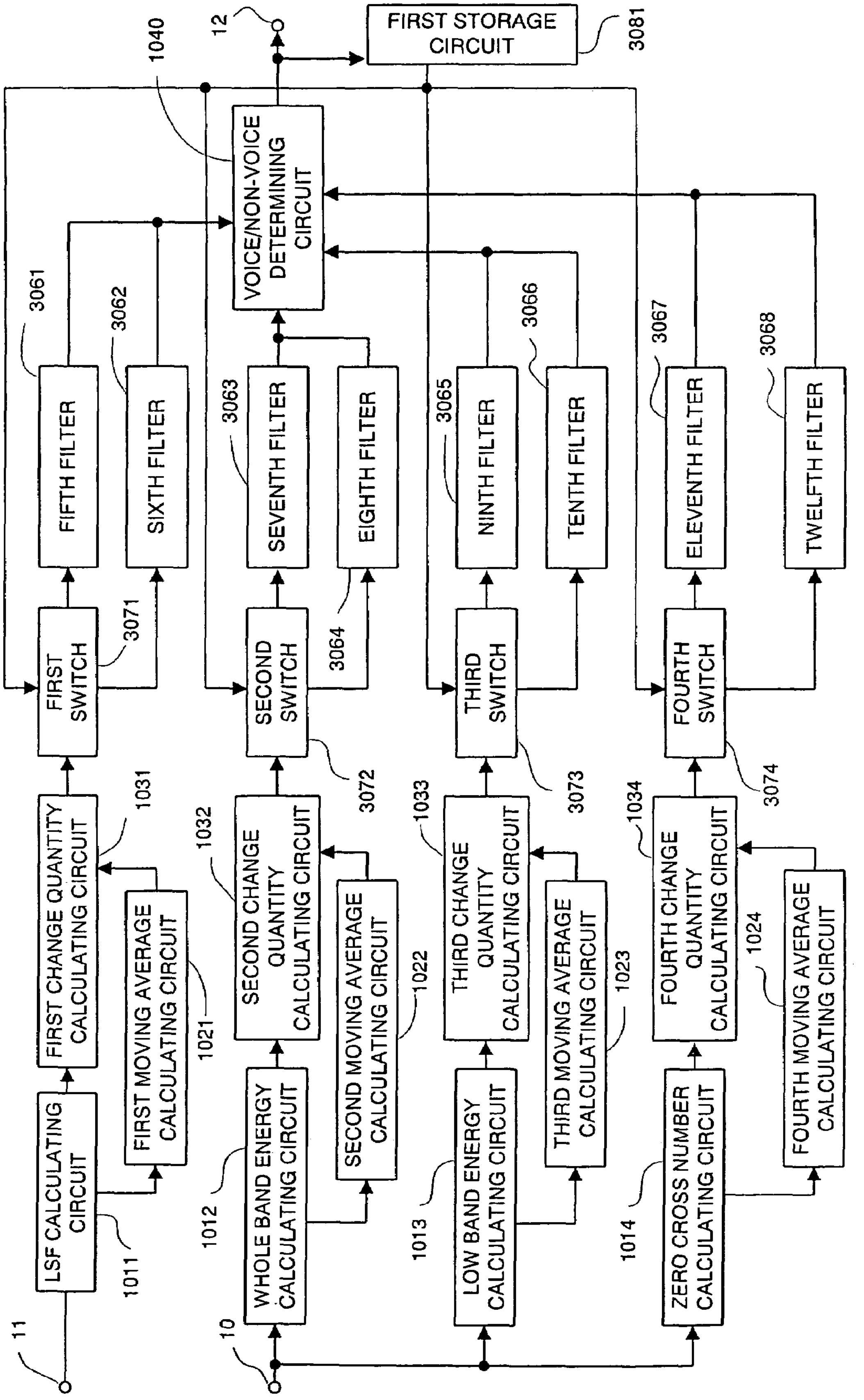
FIG. 2 is a block diagram showing the second embodiment of a voice detecting apparatus of the present invention.

Next, a second embodiment of the present invention will be explained. FIG. 2 is a view showing an arrangement of the second embodiment of a voice detecting apparatus of the present invention. In FIG. 2, the same reference numerals are attached to elements same as or similar to those in FIG. 1 and FIG. 6.

Referring to FIG. 2, in the second embodiment of the present invention, filters for calculating average values of the first change quantities, the second change quantities, the third change quantities and the fourth change quantities, respectively, are switched in accordance with outputs from the voice/non-voice determining circuit 1040. Here, if the filters for calculating the average values are assumed to be the smoothing filters same as the above-described first embodiment, parameters for controlling strength of smooth (smoothing strength parameters), $\gamma_S$, $\gamma_{Ef}$, $\gamma_{El}$ and $\gamma_{Zc}$ are made large in a voice section (in other words, in case that a determination flag output from the voice/non-voice determining circuit 1040 is 1). Accordingly, the above-described first change quantities and an average value of each difference become to reflect a whole characteristic of the voice section more, and it is possible to further reduce a detection error in the voice section. On the other hand, in a non-voice section (in case that the above-described determination flag is 0), by making the above smoothing strength parameters small, in transition from the non-voice section to the voice section, it is possible to avoid a delay of transition of the determination flag, namely, a detection error, which occurs by smoothing the above-described change quantities and each difference.

In addition, since input terminals 10 and 11, an output terminal 12, an LSF calculating circuit 1011, a whole band energy calculating circuit 1012, a low band energy calculating circuit 1013, a zero cross number calculating circuit 1014, a first moving average calculating circuit 1021, a second moving average calculating circuit 1022, a third moving average calculating circuit 1023, a fourth moving average calculating circuit 1024, a first change quantity calculating circuit 1031, a second change quantity calculating circuit 1032, a third change quantity calculating circuit 1033, a fourth change quantity calculating circuit 1034, and a voice/non-voice determining circuit 1040 are the same as the elements shown in FIG. 5, explanation of these elements will be omitted.

Referring to FIG. 2, in the second embodiment of the present invention, instead of the first filter 2061, the second filter 2062, the third filter 2063 and the fourth filter 2064 in the arrangement of the first embodiment shown in FIG. 1, a fifth filter 3061, a sixth filter 3062, a seventh filter 3063, an eighth filter 3064, a ninth filter 3065, a tenth filter 3066, an eleventh filter 3067, a twelfth filter 3068, a first switch 3071, a second switch 3072, a third switch 3073, a fourth switch 3074 and a first storage circuit 3081 are added. These will be explained below.

The first storage circuit 3081 receives a determination flag from the voice/non-voice determining circuit 1040, and stores and holds this, and outputs the above-described stored and held determination flag in the past frames to the first switch 3071, the second switch 3072, the third switch 3073 and the fourth switch 3074.

The first switch 3071 receives the first change quantities from the first change quantity calculating circuit 1031, and receives the determination flag in the past frames from the first storage circuit 3081, and when the above-described determination flag is 1 (a voice section), the first switch outputs the above-described first change quantities to the fifth filter 3061, and when the above-described determination flag is 0 (a non-voice section), the first switch outputs the above-described first change quantities to the sixth filter 3062.

The fifth filter 3061 receives the first change quantities from the first switch 3071, and calculates a first average change quantity that is a value in which average performance of the above-described first change quantities is reflected, such as an average value, a median value and a most frequent value of the above-described first change quantities, and outputs the above-described first average change quantity to the voice/non-voice determining circuit 1040. Here, for the calculation of the above-described average value, the median value or the most frequent value, a linear filter and a non-linear filter can be used. Here, by using a smoothing filter of the following equation, from the first change quantities $\Delta S^{[m]}$ in the m-th frame and the first average change quantity $$\Delta\overline{S}^{[m-1]}$$

in the (m−1)-th frame, the first average change quantity $$\Delta\overline{S}^{[m]}$$

in the m-th frame is calculated.

$$\Delta\overline{S}^{[m]} = \gamma_{S1} \cdot \Delta\overline{S}^{[m-1]} + (1-\gamma_{S1}) \cdot \Delta S^{[m]}$$

Here, $\gamma_{S1}$ is a constant number, and for example, $\gamma_{S1}=0.80$.

The sixth filter 3062 receives the first change quantities from the first switch 3071, and calculates a first average change quantity that is a value in which average performance of the above-described first change quantities is reflected, such as an average value, a median value and a most frequent value of the above-described first change quantities, and outputs the above-described first average change quantity to the voice/non-voice determining circuit 1040. Here, for the calculation of the above-described average value, the median value or the most frequent value, a linear filter and a non-linear filter can be used. Here, by using a smoothing filter of the following equation, from the first change quantities $\Delta S^{[m]}$ in the m-th frame and the first average change quantity $$\Delta\overline{S}^{[m-1]}$$

in the (m−1)-th frame, the first average change quantity $$\Delta\bar{S}^{[m]}$$

in the m-th frame is calculated.

$$\Delta\bar{S}^{[m]}=\gamma_{S2}\cdot\Delta\bar{S}^{[m-1]}+(1-\gamma_{S2})\cdot\Delta S^{[m]}$$

Here, $\gamma_{S2}$ is a constant number. However, $$\gamma_{S2}\leqq\gamma_{S1}$$

and for example, $\gamma_{S2}=0.64$.

The second switch 3072 receives the second change quantities from the second change quantity calculating circuit 1032, and receives the determination flag in the past frames from the first storage circuit 3081, and when the above-described determination flag is 1 (a voice section), the second switch outputs the above-described second change quantities to the seventh filter 3063, and when the above-described determination flag is 0 (a non-voice section), the second switch outputs the above-described second change quantities to the eighth filter 3064.

The seventh filter 3063 receives the second change quantities from the second switch 3072, and calculates a second average change quantity that is a value in which average performance of the above-described second change quantities is reflected, such as an average value, a median value and a most frequent value of the above-described second change quantities, and outputs the above-described second average change quantity to the voice/non-voice determining circuit 1040. Here, for the calculation of the above-described average value, the median value or the most frequent value, a linear filter and a non-linear filter can be used. Here, by using a smoothing filter of the following equation, from the second change quantities $\Delta E_f^{[m]}$ in the m-th frame and the second average change quantity $$\Delta\bar{E}_f^{[m-1]}$$

in the (m−1)-th frame, the second average change quantity $$\Delta\bar{E}_f^{[m]}$$

in the m-th frame is calculated.

$$\Delta\bar{E}_f^{[m]}=\gamma_{Ef1}\cdot\Delta\bar{E}_f^{[m-1]}+(1-\gamma_{Ef1})\cdot\Delta E_f^{[m]}$$

Here, $\gamma_{Ef1}$ is a constant number, and for example, $\gamma_{Ef1}0.70$.

The eighth filter 3064 receives the second change quantities from the second switch 3072, and calculates a second average change quantity that is a value in which average performance of the above-described second change quantities is reflected, such as an average value, a median value and a most frequent value of the above-described second change quantities, and outputs the above-described second average change quantity to the voice/non-voice determining circuit 1040. Here, for the calculation of the above-described average value, the median value or the most frequent value, a linear filter and a non-linear filter can be used. Here, by using a smoothing filter of the following equation, from the second change quantities $\Delta E_f^{[m]}$ in the m-th frame and the second average change quantity $$\Delta\bar{E}_f^{[m-1]}$$

in the (m−1)-th frame, the second average change quantity $$\Delta\bar{E}_f^{[m]}$$

in the m-th frame is calculated.

$$\Delta\bar{E}_f^{[m]}=\gamma_{Ef2}\cdot\Delta\bar{E}_f^{[m-1]}+(1-\gamma_{Ef2})\cdot\Delta E_f^{[m]}$$

Here, $\gamma_{Ef2}$ is a constant number. However, $$\gamma_{Ef2}\leqq\gamma_{Ef1}$$

and for example, $\gamma_{Ef2}=0.54$.

The third switch 3073 receives the third change quantities from the third change quantity calculating circuit 1033, and receives the determination flag in the past frames from the first storage circuit 3081, and when the above-described determination flag is 1 (a voice section), the third switch outputs the above-described third change quantities to the ninth filter 3065, and when the above-described determination flag is 0 (a non-voice section), the third switch outputs the above-described third change quantities to the tenth filter 3066.

The ninth filter 3065 receives the third change quantities from the third switch 3073, and calculates a third average change quantity that is a value in which average performance of the above-described third change quantities is reflected, such as an average value, a median value and a most frequent value of the above-described third change quantities, and outputs the above-described third average change quantity to the voice/non-voice determining circuit 1040. Here, for the calculation of the above-described average value, the median value or the most frequent value, a linear filter and a non-linear filter can be used. Here, by using a smoothing filter of the following equation, from the third change quantities $\Delta E_l^{[m]}$ in the m-th frame and the third average change quantity $$\Delta\bar{E}_l^{[m-1]}$$

in the (m−1)-th frame, the third average change quantity $$\Delta\bar{E}_l^{[m]}$$

in the m-th frame is calculated.

$$\Delta\bar{E}_l^{[m]}=\gamma_{El1}\cdot\Delta\bar{E}_l^{[m-1]}+(1-\gamma_{El1})\cdot\Delta E_l^{[m]}$$

Here, $\gamma_{El1}$ is a constant number, and for example, $\gamma_{El1}=0.70$.

The tenth filter 3066 receives the third change quantities from the third switch 3073, and calculates a third average change quantity that is a value in which average performance of the above-described third change quantities is reflected, such as an average value, a median value and a most frequent value of the above-described third change quantities, and outputs the above-described third average change quantity to the voice/non-voice determining circuit 1040. Here, for the calculation of the above-described average value, the median value or the most frequent value, a linear filter and a non-linear filter can be used. Here, by using a smoothing filter of the following equation, from the third change quantities $\Delta E_l^{[m]}$ in the m-th frame and the third average change quantity $$\bar{E}_l^{[m-1]}$$

in the (m−1)-th frame, the third average change quantity $$\Delta\overline{E}_l^{[m]}$$

in the m-th frame is calculated.

$$\Delta\overline{E}_l^{[m]}=\gamma_{El2}\cdot\Delta\overline{E}_l^{[m-1]}+(1-\gamma_{El2})\cdot\Delta E_l^{[m]}$$

Here, $\gamma_{El2}$ is a constant number. However, $$\gamma_{El2}\leqq\gamma_{El1}$$

and for example, $\gamma_{El2}$=0.54.

The fourth switch 3074 receives the fourth change quantities from the fourth change quantity calculating circuit 1034, and receives the determination flag in the past frames from the first storage circuit 3081, and when the above-described determination flag is 1 (a voice section), the fourth switch outputs the above-described fourth change quantities to the eleventh filter 3067, and when the above-described determination flag is 0 (a non-voice section), the fourth switch outputs the above-described fourth change quantities to the twelfth filter 3068.

The eleventh filter 3067 receives the fourth change quantities from the fourth switch 3074, and calculates a fourth average change quantity that is a value in which average performance of the above-described fourth change quantities is reflected, such as an average value, a median value and a most frequent value of the above-described fourth change quantities, and outputs the above-described fourth average change quantity to the voice/non-voice determining circuit 1040. Here, for the calculation of the above-described average value, the median value or the most frequent value, a linear filter and a non-linear filter can be used. Here, by using a smoothing filter of the following equation, from the fourth change quantities $\Delta Z_c^{[m]}$ in the m-th frame and the fourth average change quantity $$\Delta\overline{Z}_c^{[m-1]}$$

in the (m−1)-th frame, the fourth average change quantity $$\Delta\overline{Z}_c^{[m]}$$

in the m-th frame is calculated.

$$\Delta\overline{Z}_c^{[m]}=\gamma_{Zc1}\cdot\Delta\overline{Z}_c^{[m-1]}+(1-\gamma_{Zc1})\cdot\Delta Z_c^{[m]}$$

Here, $\gamma_{Zc1}$ is a constant number, and for example, $\gamma_{Zc1}$=0.78.

The twelfth filter 3068 receives the fourth change quantities from the fourth switch 3074, and calculates a fourth average change quantity that is a value in which average performance of the above-described fourth change quantities is reflected, such as an average value, a median value and a most frequent value of the above-described fourth change quantities, and outputs the above-described fourth average change quantity to the voice/non-voice determining circuit 1040. Here, for the calculation of the above-described average value, the median value or the most frequent value, a linear filter and a non-linear filter can be used. Here, by using a smoothing filter of the following equation, from the fourth change quantities $\Delta Z_c^{[m]}$ in the m-th frame and the fourth average change quantity $$\Delta\overline{Z}_c^{[m-1]}$$

in the (m−1)-th frame, the fourth average change quantity $$\Delta\overline{Z}_c^{[m]}$$

in the m-th frame is calculated.

$$\Delta\overline{Z}_c^{[m]}=\gamma_{Zc2}\cdot\Delta\overline{Z}_c^{[m-1]}+(1-\gamma_{Zc2})\cdot\Delta Z_c^{[m]}$$

Here, $\gamma_{Zc2}$ is a constant number. However, $$\gamma_{Zc2}\leqq\gamma_{Zc1}$$

and for example, $\gamma_{Zc2}$=0.64.

Figure 3:
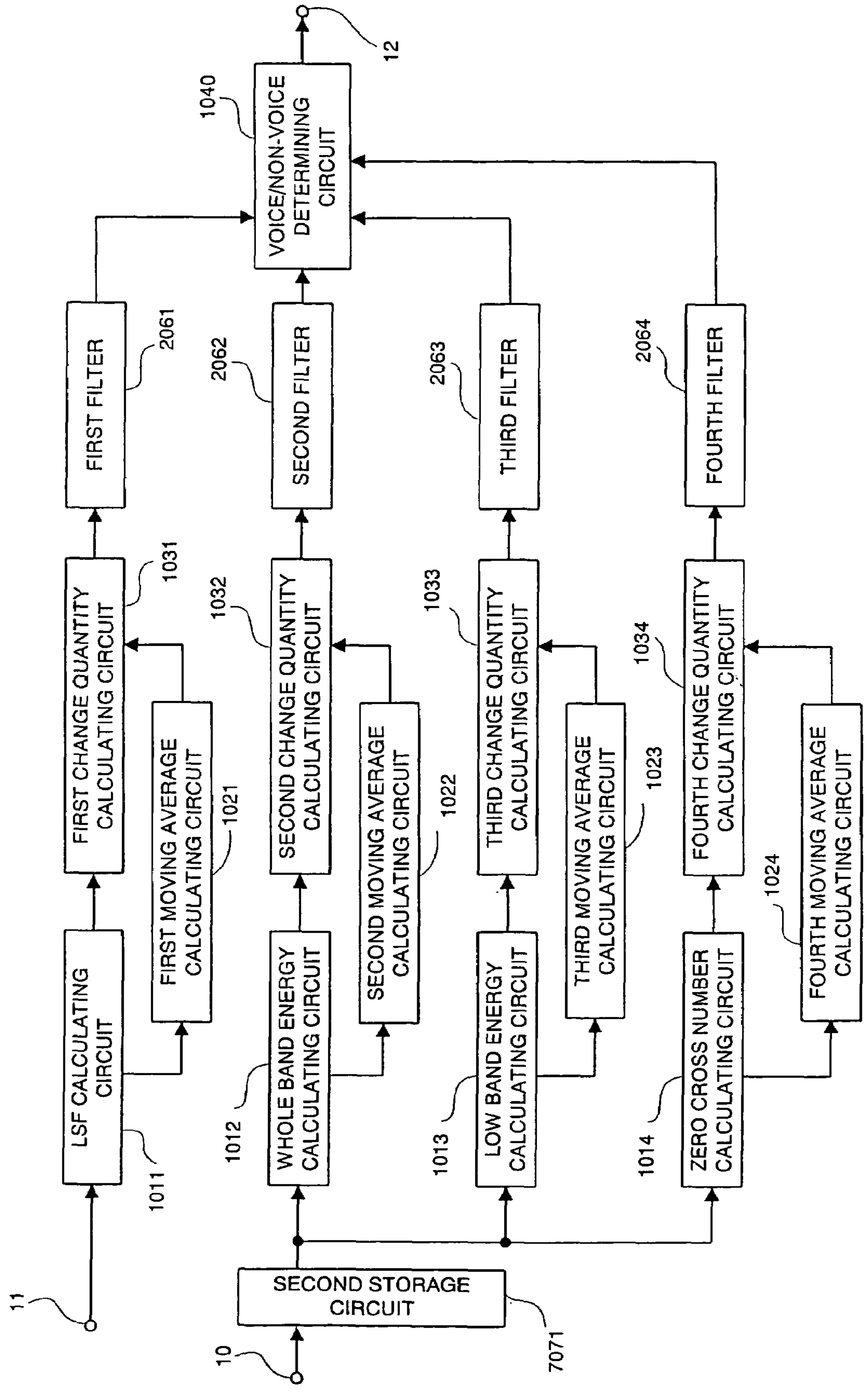
FIG. 3 is a block diagram showing the third embodiment of a voice detecting apparatus of the present invention.

Next, a third embodiment of the present invention will be explained. FIG. 3 is a view showing an arrangement of the third embodiment of a voice detecting apparatus of the present invention. In FIG. 3, the same reference numerals are attached to elements same as or similar to those in FIG. 1. This embodiment is shown as an example of an arrangement in which the voice detecting apparatus in accordance with the first embodiment of the present application is utilized, for example, for a purpose for switching decode processing methods in accordance with voice and non-voice in a voice decoding device. Accordingly, in this embodiment, regenerative voice which was output from the above-described voice decoding device in the past is input via an input terminal 10, and a linear predictive coefficient decoded in the voice decoding device is input via an input terminal 11. In addition, since an output terminal 12, an LSF calculating circuit 1011, a whole band energy calculating circuit 1012, a low band energy calculating circuit 1013, a zero cross number calculating circuit 1014, a first moving average calculating circuit 1021, a second moving average calculating circuit 1022, a third moving average calculating circuit 1023, a fourth moving average calculating circuit 1024, a first change quantity calculating circuit 1031, a second change quantity calculating circuit 1032, a third change quantity calculating circuit 1033, a fourth change quantity calculating circuit 1034, a first filter 2061, a second filter 2062, a third filter 2063, a fourth filter 2064 and a voice/non-voice determining circuit 1040 are the same as the elements shown in FIG. 1, explanation thereof will be omitted.

Referring to FIG. 3, in the third embodiment of the present invention, in addition to the arrangement in the first embodiment shown in FIG. 1, a second storage circuit 7071 is provided. The above-described second storage circuit 7071 will be explained below.

The second storage circuit 7071 receives regenerative voice output from the voice decoding device via the input terminal 10, and stores and holds this, and outputs stored and held regenerative signals in the past frames to the whole band energy calculating circuit 1012, the low band energy calculating circuit 1013 and the zero cross number calculating circuit 1014.

Figure 4:
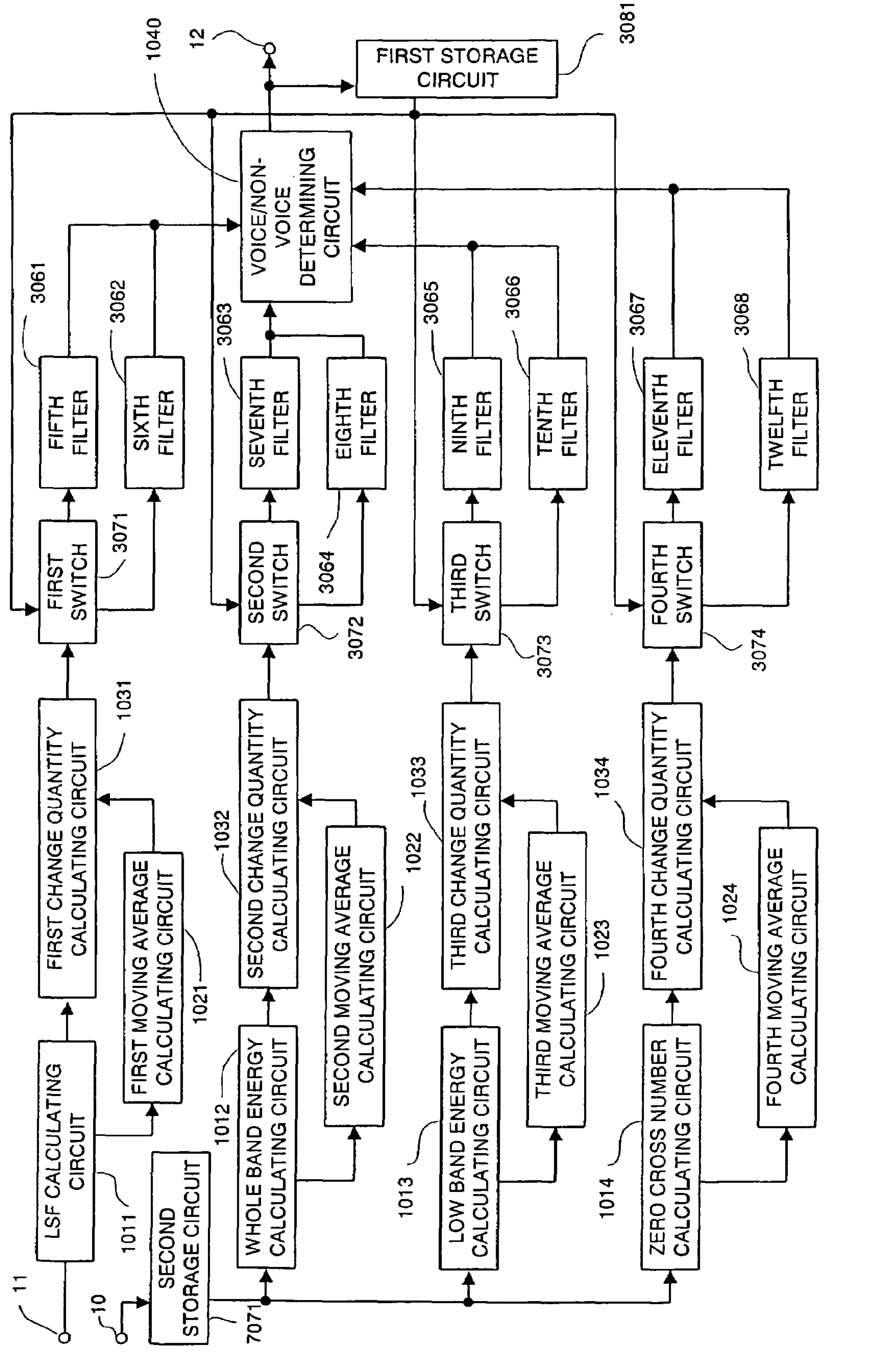
FIG. 4 is a block diagram showing the fourth embodiment of a voice detecting apparatus of the present invention.

Next, a fourth embodiment of the present invention will be explained. FIG. 4 is a view showing an arrangement of the fourth embodiment of a voice detecting apparatus of the present invention. In FIG. 4, the same reference numerals are attached to elements same as or similar to those in FIG. 2. This embodiment is shown as an example of an arrangement in which the voice detecting apparatus in accordance with the second embodiment of the present application is utilized, for example, for a purpose for switching decode processing methods in accordance with voice and non-voice in a voice decoding device. Accordingly, in this embodiment, regenerative voice which was output from the above-described voice decoding device is input via an input terminal 10, and a linear predictive coefficient decoded in the voice decoding device is input via an input terminal 11. In addition, since an output terminal 12, an LSF calculating circuit 1011, a whole band energy calculating circuit 1012, a low band energy calculating circuit 1013, a zero cross number calculating circuit 1014, a first moving average calculating circuit 1021, a second moving average calculating circuit 1022, a third moving average calculating circuit 1023, a fourth moving average calculating circuit 1024, a first change quantity calculating circuit 1031, a second change quantity calculating circuit 1032, a third change quantity calculating circuit 1033, a fourth change quantity calculating circuit 1034, a first switch 3071, a second switch 3072, a third switch 3073, a fourth switch 3074, a fifth filter 3061, a sixth filter 3062, a seventh filter 3063, an eighth filter 3064, a ninth filter 3065, a tenth filter 3066, an eleventh filter 3067, a twelfth filter 3068, a first storage circuit 3081 and a voice/non-voice determining circuit 1040 are the same as the elements shown in FIG. 2, explanation thereof will be omitted.

Referring to FIG. 4, in the fourth embodiment of the present invention, in addition to the arrangement in the second embodiment shown in FIG. 2, a second storage circuit 7071 is provided. Here, since the above-described second storage circuit 7071 is the same as an element shown in FIG. 3, explanation thereof will be omitted.

The above-described voice detecting apparatus of each embodiment of the present invention can be realized by means of computer control such as a digital signal processing processor. FIG. 5 is a view schematically showing an apparatus arrangement as a fifth embodiment of the present invention, in a case where the above-described voice detecting apparatus of each embodiment is realized by a computer. In a computer 1 for executing a program read out from a recording medium 6, for executing voice detecting processing of discriminating a voice section from a non-voice section for every fixed time length for a voice signal, using feature quantity calculated from the above-described voice signal input for every fixed time length, a program for executing processes (a) to (l) is recorded in the recording medium 6:

(a) a process of calculating a line spectral frequency (LSF) from the above-described voice signal;

(b) a process of calculating a whole band energy from the above-described voice signal;

(c) a process of calculating a low band energy from the above-described voice signal;

(d) a process of calculating a zero cross number from the above-described voice signal;

(e) a process of calculating first change quantities based on a difference between the above-described line spectral frequency and a long-time average thereof;

(f) a process of calculating second change quantities based on a difference between the above-described whole band energy and a long-time average thereof;

(g) a process of calculating third change quantities based on a difference between the above-described low band energy and a long-time average thereof;

(h) a process of calculating fourth change quantities based on a difference between the above-described zero cross number and a long-time average thereof;

(I) a process of calculating a long-time average of the above-described first change quantities;

(j) a process of calculating a long-time average of the above-described second change quantities;

(k) a process of calculating a long-time average of the above-described third change quantities; and (l) a process of calculating a long-time average of the above-described fourth change quantities.

From the recording medium 6, this program is read out in a memory 3 via a recording medium reading device 5 and a recording medium reading device interface 4, and is executed. The above-described program can be stored in a mask ROM and so forth, and a non-volatile memory such as a flush memory, and the recording medium includes a non-volatile memory, and in addition, includes a medium such as a CD-ROM, an FD, a DVD (Digital Versatile Disk), an MT (Magnetic Tape) and a portable type HDD, and also, includes a communication medium by which a program is communicated by wire and wireless like a case where the program is transmitted by means of a communication medium from a server device to a computer.

In the computer 1 for executing a program read out from the recording medium 6, for executing voice detecting processing of discriminating a voice section from a non-voice section for every fixed time length for a voice signal, using feature quantity calculated from the above-described voice signal input for every fixed time length, a program for executing processes (a) to (e) in the above-described computer 1 is recorded in the recording medium 6:

(a) a process of holding a result of the above-described discrimination, which was output in the past;

(b) a process of switching the fifth filter to the sixth filter using the result of the above-described discrimination, which is input from the above-described first storage circuit, when the long-time average of the above-described first change quantities is calculated;

(c) a process of switching the seventh filter to the eighth filter using the result of the above-described discrimination, which is input from the above-described first storage circuit, when the long-time average of the above-described second change quantities is calculated;

(d) a process of switching the ninth filter to the tenth filter using the result of the above-described discrimination, which is input from the above-described first storage circuit, when the long-time average of the above-described third change quantities is calculated; and (e) a process of switching the eleventh filter to the twelfth filter using the result of the above-described discrimination, which is input from the above-described first storage circuit, when the long-time average of the above-described fourth change quantities is calculated.

In the computer 1 for executing a program read out from the recording medium 6, for executing voice detecting processing of discriminating a voice section from a non-voice section for every fixed time length for a voice signal, using feature quantity calculated from the above-described voice signal input for every fixed time length, a program for executing in the above-described computer 1 a process of calculating the above-described line spectral frequency, the above-described whole band energy, the above-described low band energy and the above-described zero cross number from the above-described voice signal input in the past is recorded in the recording medium 6.

In the computer 1 for executing a program read out from the recording medium 6, a program for executing processes (a) to (e) in the above-described computer 1 is recorded in the recording medium 6:

(a) a process of storing and holding a regenerative voice signal output from a voice decoding device in the past;

(b) a process of calculating a whole band energy from the above-described regenerative voice signal;

(c) a process of calculating a low band energy from the above-described regenerative voice signal;

(d) a process of calculating a zero cross number from the above-described regenerative voice signal; and (e) a process of calculating a line spectral frequency from a linear predictive coefficient decoded in the above-described voice decoding device.

Figure 7:
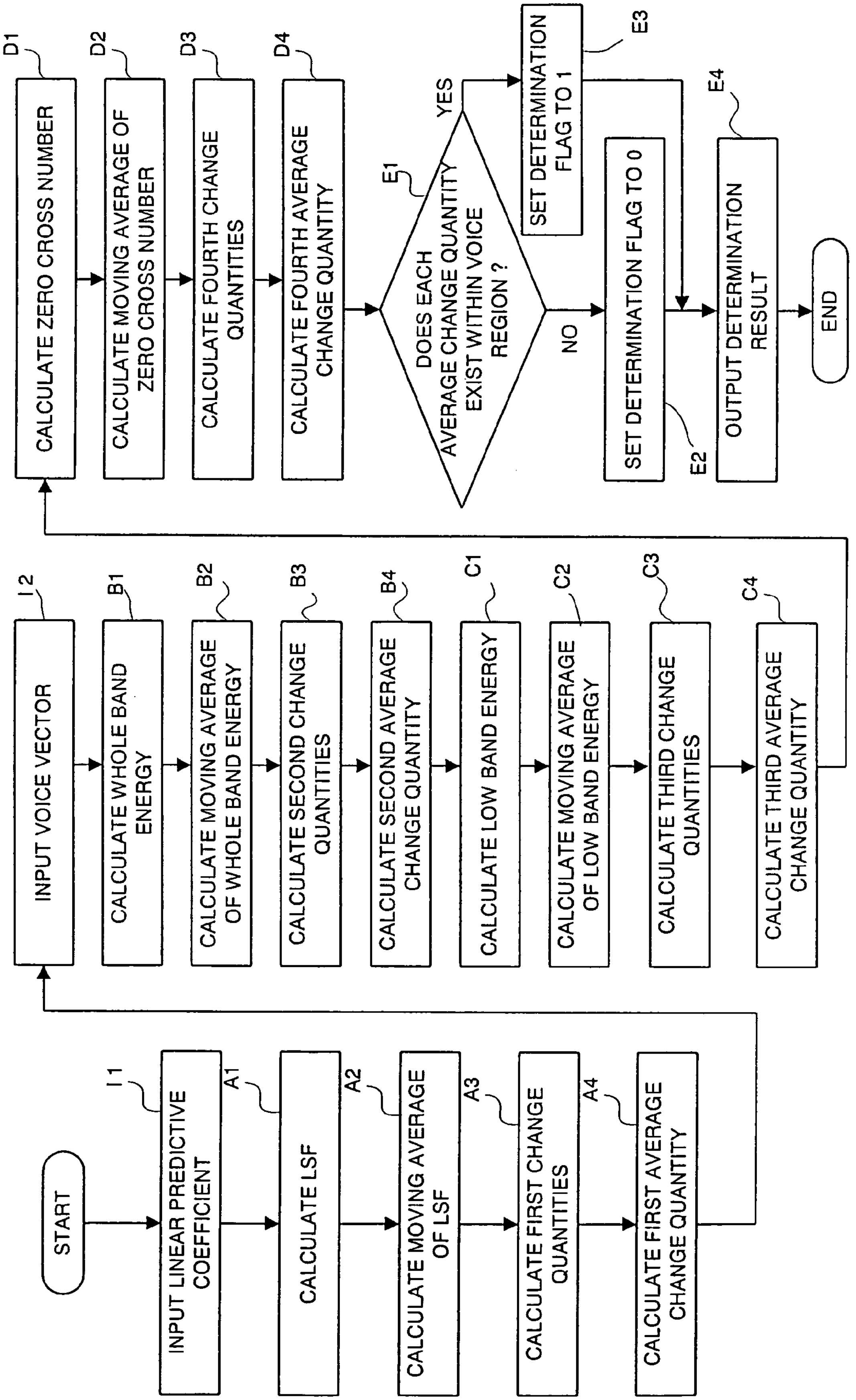
FIG. 7 is a flowchart for explaining an operation of the embodiment of the present invention.

Next, an operation of the above-mentioned processing will be explained using a flowchart. First, an operation corresponding to the above-mentioned first embodiment will be explained. FIG. 7 is a flowchart for explaining the operation corresponding to the first embodiment.

A linear predictive coefficient is input (Step 11), and a line spectral frequency (LSF) is calculated from the above-described linear predictive coefficient (Step A1). Here, with regard to the calculation of the LSF from the linear predictive coefficient, a well-known method, for example, a method and so forth described in Paragraph 3.2.3 of the Literature 1 are used.

Next, a moving average LSF in the current frame (present frame) is calculated from the calculated LSF and an average LSF calculated in the past frames (Step A2).

Here, if an LSF in the m-th frame is assumed to be an average LSF in the m-th frame $$\omega_i^{[m]},\ i=1, \ldots, P$$

an average LSF in the m-th frame $$\overline{\omega}_i^{[m]},\ i=1, \ldots, P$$

is represented by the following equation:

$$\overline{\omega}_i^{[m]}=\beta_{LSF}\cdot\overline{\omega}_i^{[m-1]}+(1-\beta_{LSF})\cdot\omega_i^{[m]},\ i=1, \ldots, P$$

Here, P is a linear predictive order (for example, 10), and $\beta_{LSF}$ is a certain constant number (for example, 0.7).

Subsequently, based on the calculated LSF $\alpha_i^{[m]}$ and moving average LSF $$\overline{\omega}_i^{[m]}$$

spectral change quantities (first quantities) are calculated (Step A3).

Here, the first change quantities $\Delta S^{[m]}$ in the m-th frame are represented by the following equation:

$$\Delta S^{[m]} = \sum_{i=1}^{P} (\omega_i^{[m]} - \overline{\omega}_i^{[m]})^2$$

Further, from the first change quantities $\Delta S^{[m]}$, a first average change quantity is calculated, which is a value in which average performance of the above-described first change quantities is reflected, such as an average value, a median value and a most frequent value of the above-described first change quantities (Step A3).

Here, by using a smoothing filter of the following equation, from the first change quantities $\Delta S^{[m]}$ in the m-th frame and the first average change quantity $$\Delta\overline{S}^{[m-1]}$$

in the (m−1)-th frame, the first average change quantity $$\Delta\overline{S}^{[m]}$$

in the m-th frame is calculated.

$$\Delta\overline{S}^{[m]}=\gamma_S\cdot\Delta\overline{S}^{[m-1]}+(1-\gamma_S)\cdot\Delta S^{[m]}$$

Here, $\gamma_S$ is a constant number, and for example, $\gamma_S$=0.74.

Also, voice (input voice) is input (Step 12), and a whole band energy of the input voice is calculated (Step B1).

Here, the whole band energy $E_f$ is a logarithm of a normalized zero-degree autocorrelation function R(0), and is represented by the following equation:

$$E_f = 10 \cdot \log_{10}\left[\frac{1}{N}R(0)\right]$$

Also, an autocorrelation coefficient is represented by the following equation:

$$R(k)\sum_{n=k}^{N-1} s^1(n)s^1(n-k)$$

Here, N is a length (analysis window length, for example, 240 samples) of a window of the linear predictive analysis for the input voice, and $S^1(n)$ is the input voice multiplied by the above-described window. In case of $N>L_{fr}$, by holding the voice which was input in the past frame, it shall be voice for the above-described analysis window length.

Next, a moving average of the whole band energy in the current frame is calculated from the whole band energy $E_f$ and an average whole band energy calculated in the past frames (Step B2).

Here, assuming that a whole band energy in the m-th frame is $E_f^{[m]}$, the moving average of the whole band energy in the m-th frame $$\overline{E}_f^{[m]}$$

is represented by the following equation:

$$\overline{E}_f^{[m]}=\beta_{Ef}\cdot\overline{E}_f^{[m-1]}+(1-\beta_{Ef})\cdot E_f^{[m]}$$

Here, $\beta_{Ef}$ is a certain constant number (for example, 0.7).

Next, from the whole band energy $E_f^{[m]}$ and the moving average of the whole band energy $$\overline{E}_f^{[m]}$$

whole band energy change quantities (second change quantities) are calculated (Step B3).

Here, the second change quantities $\Delta E_f^{[m]}$ in the m-th frame are represented by the following equation:

$$\Delta E_f^{[m]}=\overline{E}_f^{[m]}-E_f^{[m]}$$

Further, from the second change quantities $\Delta E_f^{[m]}$, a second average change quantity is calculated, which is a value in which average performance of the above-described second change quantities is reflected, such as an average value, a median value and a most frequent value of the above-described second change quantities (Step B4).

Here, by using a smoothing filter of the following equation, from the second change quantities $\Delta E_f^{[m]}$ in the m-th frame and the second average change quantity $$\bar{E}_f^{[m-1]}$$

in the (m−1)-th frame, the second average change quantity $$\Delta \bar{E}_f^{[m]}$$

in the m-th frame is calculated.

$$\Delta\bar{E}_f^{[m]}=\gamma_{Ef}\cdot\Delta\bar{E}_f^{[m-1]}+(1-\gamma_{Ef})\cdot\Delta E_f^{[m]}$$

Here, $\gamma_{Ef}$ is a constant number, and for example, $\gamma_{Ef}=0.6$.

Also, from the input voice, a low band energy of the input voice is calculated (Step C1). Here, the low band energy $E_i$ from 0 to $F_i$ Hz is represented by the following equation:

$$E_l = 10\cdot\log_{10}\left[\frac{1}{N}\hat{h}^T\hat{R}\hat{h}\right]$$

Here, $$\hat{h}$$

is an impulse response of an FIR filter, a cutoff frequency of which is $F_1$ Hz, and $$\hat{R}$$

is a Teplitz autocorrelation matrix, diagonal components of which are autocorrelation coefficients R(k).

Next, a moving average of the low band energy in the current frame is calculated from the low band energy and an average low band energy calculated in the past frames (Step C2). Here, assuming that a low band energy in the m-th frame is $E_l^{[m]}$, the average low band energy in the m-th frame $$\bar{E}_l^{[m]}$$

is represented by the following equation:

$$\bar{E}_l^{[m]}=\beta_{El}\cdot\bar{E}_l^{[m-1]}+(1-\beta_{El})\cdot E_l^{[m]}$$

Here, $\beta_{El}$ is a certain constant number (for example, 0.7).

Subsequently, from the low band energy $E_l^{[m]}$ and the moving average of the low band energy $$\bar{E}_l^{[m]}$$

low band energy change quantities (third change quantities) are calculated (Step C3). Here, the third change quantities $\Delta E_l^{[m]}$ in the m-th frame are represented by the following equation:

$$\Delta E_l^{[m]}=\bar{E}_l^{[m]}=E_l^{[m]}$$

Further, a third average change quantity is calculated, which is a value in which average performance of the above-described third change quantities is reflected, such as an average value, a median value and a most frequent value of the above-described third change quantities (Step C4). Here, by using a smoothing filter of the following equation, from the third change quantities $\Delta E_l^{[m]}$ in the m-th frame and the third average change quantity $$\Delta\bar{E}_l^{[m-1]}$$

in the (m−1)-th frame, the third average change quantity $$\Delta\bar{E}_l^{[m]}$$

in the m-th frame is calculated.

$$\Delta\bar{E}_l^{[m]}=\gamma_{El}\cdot\Delta\bar{E}_l^{[m-1]}+(1-\gamma_{El})\cdot\Delta E_l^{[m]}$$

Here, $\gamma_{El}$ is a constant number, and for example, $\gamma_{El}=0.6$.

Also, from voice (input voice), a zero cross number of an input voice vector is calculated (Step D1). Here, a zero cross number $Z_c$ is represented by the following equation:

$$Z_c = \frac{1}{2L_{fr}}\sum_{n=0}^{L_{fr}-1}|sgn[s(n)] - sgn[s(n-1)]|$$

Here, S(n) is the input voice, and sgn[x] is a function which is 1 when x is a positive number and which is 0 when it is a negative number.

Next, a moving average of the zero cross number in the current frame is calculated from the calculated zero cross number and an average zero cross number calculated in the past frames (Step D2). Here, assuming that a zero cross number in the m-th frame is $$Z_c^{[m]}$$

an average zero cross number in the m-th frame $$\bar{Z}_c^{[m]}$$

is represented by the following equation:

$$\bar{Z}_c^{[m]}=\beta_{Zc}\cdot\bar{Z}_c^{[m-1]}+(1-\beta_{Zc})\cdot Z_c^{[m]}$$

Here, $\beta_{Zc}$ is a certain constant number (for example, 0.7).

Next, from the zero cross number $Z_c^{[m]}$ and the moving average of the zero cross number $$\bar{Z}_c^{[m]}$$

zero cross number change quantities (fourth change quantities) are calculated (Step D3). Here, the fourth change quantities $\Delta Z_c^{[m]}$ in the m-th frame are represented by the following equation:

$$\Delta Z_c^{[m]}=\bar{Z}_c^{[m]}-Z_c^{[m]}$$

Further, from the fourth change quantities, a fourth average change quantity is calculated, which is a value in which average performance of the above-described fourth change quantities is reflected, such as an average value, a median value and a most frequent value of the above-described fourth change quantities (Step D4). Here, by using a smoothing filter of the following equation, from the fourth change quantities $\Delta Z_c^{[m]}$ in the m-th frame and the fourth average change quantity $$\Delta\bar{Z}_c^{[m-1]}$$

in the (m−1)-th frame, the fourth average change quantity $$\Delta\bar{Z}_c^{[m]}$$

in the m-th frame is calculated.

$$\Delta\bar{Z}_c^{[m]}=\gamma_{Zc}\cdot\Delta\bar{Z}_c^{[m-1]}+(1-\gamma_{Zc})\cdot\Delta Z_c^{[m]}$$

Here, $\gamma_{Zc}$ is a constant number, and for example, $\gamma_{Zc}=0.7$.

Finally, when a four-dimensional vector consisting of the above-described first average change quantity $$\Delta\overline{S}^{[m]}$$

the above-described second average change quantity $$\Delta\overline{E}_f^{[m]}$$

the above-described third average change quantity $$\Delta\overline{E}_l^{[m]}$$

and the above-described fourth average change quantity $$\Delta\overline{Z}_c^{[m]}$$

exists within a voice region in a four-dimensional space, it is determined that it is the voice section, and otherwise, it is determined that it is the non-voice section (Step E1).

And, in case of the above-described voice section, a determination flag is set to 1 (Step E3), and in case of the above-described non-voice section, the determination flag is set to 0 (Step E2), and a determination result is output (Step E4).

As mentioned above, the processing ends.

Figure 8:
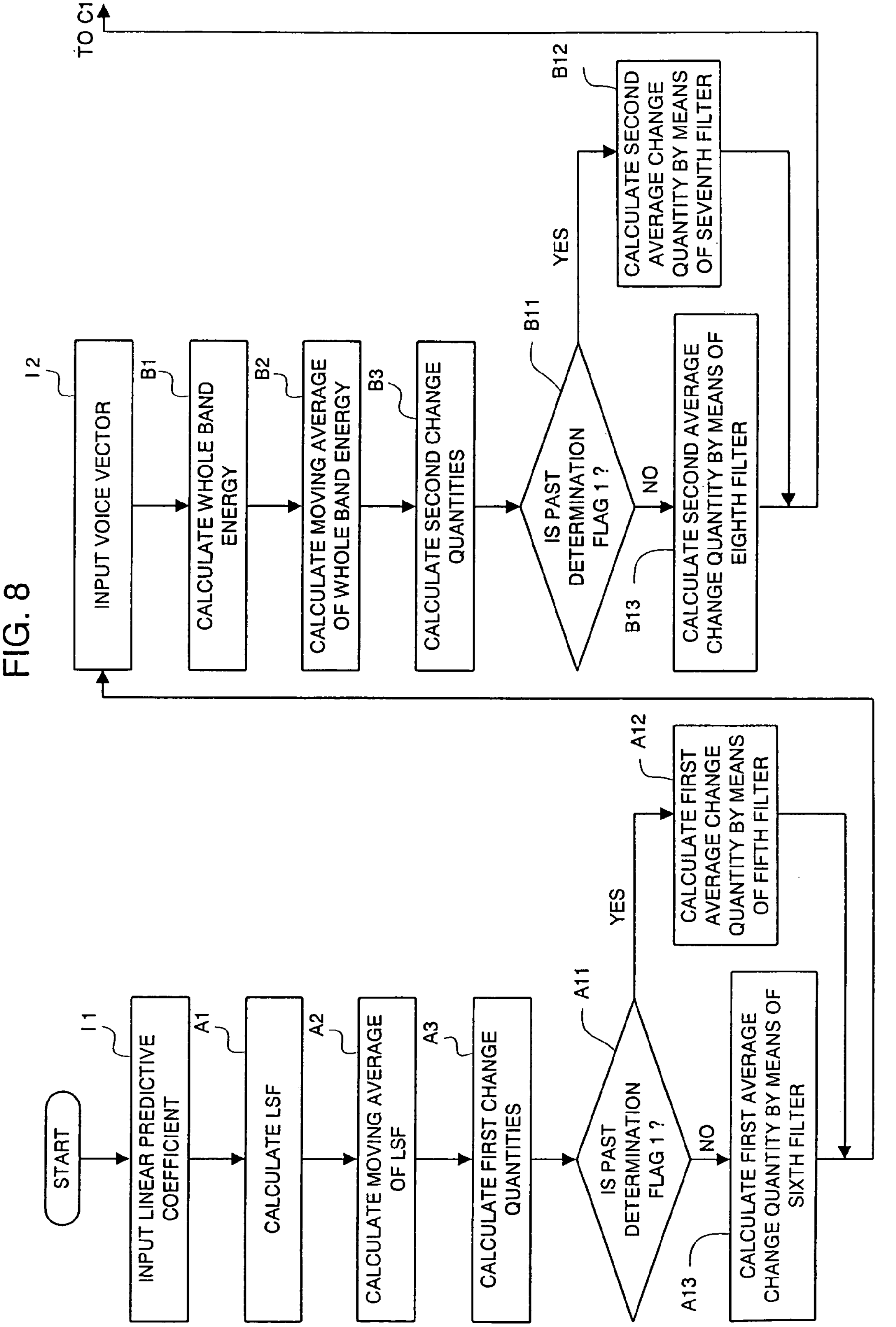
FIG. 8 is a flowchart for explaining an operation of the embodiment of the present invention.
Figure 9:
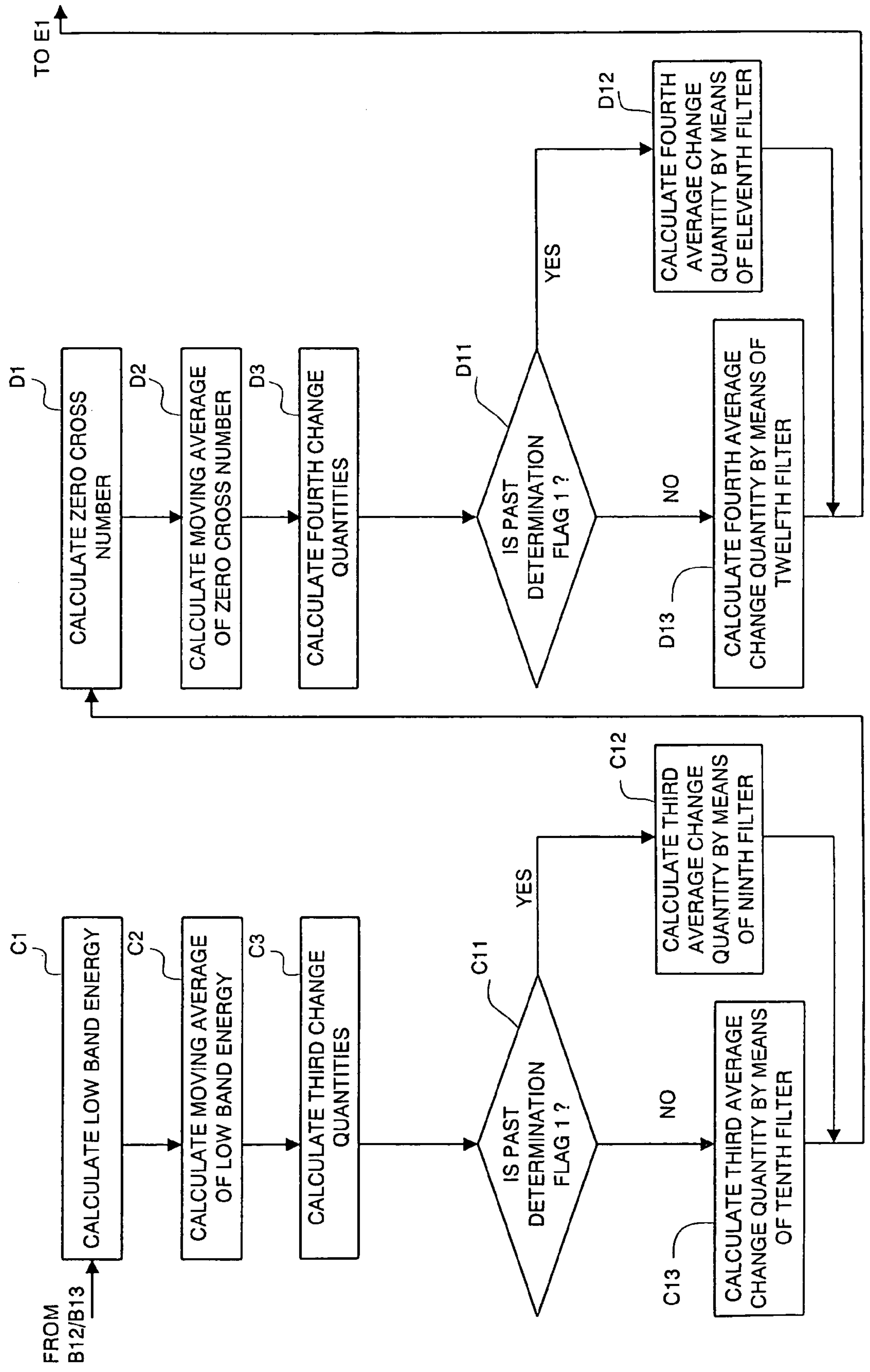
FIG. 9 is a flowchart for explaining an operation of the embodiment of the present invention.
Figure 10:
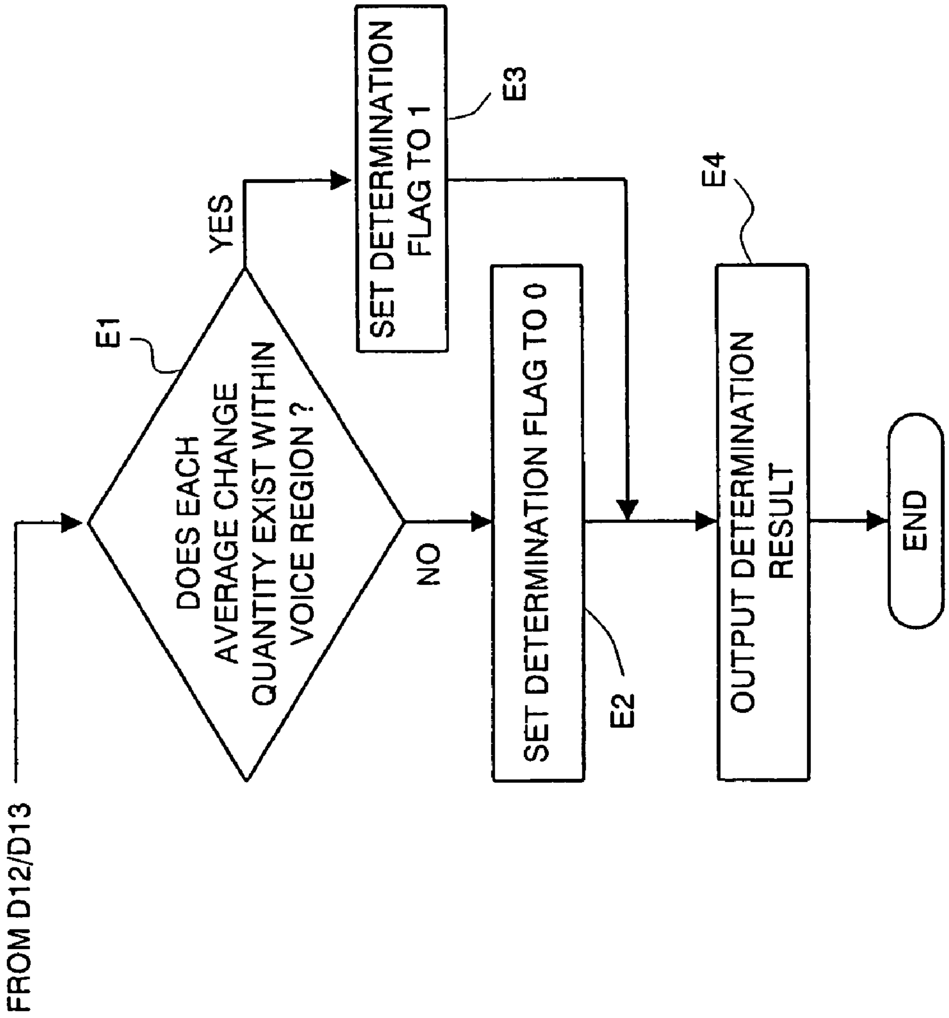
FIG. 10 is a flowchart for explaining an operation of the embodiment of the present invention.

Next, an operation of processing corresponding to the above-mentioned second embodiment will be explained using a flowchart. FIG. 8, FIG. 9 and FIG. 10 are flowcharts for explaining the operation corresponding to the second embodiment. In addition, with regard to processing having an operation same as the above-mentioned operation, explanation thereof will be omitted, and only different points will be explained.

A point different from the above-mentioned processing is that, after the first change quantities, the second change quantities, the third change quantities and the fourth change quantities are calculated, when average values of these are calculated, the filters for calculating the average values are switched in accordance with the kind of a determination flag.

First, a case of the first change quantities will be explained.

After the first change quantities are calculated at Step A3, it is confirmed whether or not the past determination flag is 1 (Step A11).

If the determination flag is 1, filter processing like the fifth filter in the second embodiment is conducted, and the first average change quantity is calculated (Step A12). For example, by using a smoothing filter of the following equation, from the first change quantities $\Delta S^{[m]}$ in the m-th frame and the first average change quantity $$\Delta\overline{S}^{[m-1]}$$

in the (m−1)-th frame, the first average change quantity $$\Delta\overline{S}^{[m]}$$

in the m-th frame is calculated.

$$\Delta\overline{S}^{[m]}=\gamma_{S1}\cdot\Delta\overline{S}^{[m-1]}+(1-\gamma_{S1})\cdot\Delta S^{[m]}$$

Here, $\gamma_{S1}$ is a constant number, and for example, $\gamma_{S1}$=0.80.

On the other hand, if the determination flag is 0, filter processing like the sixth filter in the second embodiment is conducted, and the first average change quantity is calculated (Step A13). For example, by using a smoothing filter of the following equation, from the first change quantities $\Delta S^{[m]}$ in the m-th frame and the first average change quantity $$\Delta\overline{S}^{[m-1]}$$

in the (m−1)-th frame, the first average change quantity $$\Delta\overline{S}^{[m]}$$

in the m-th frame is calculated.

$$\Delta\overline{S}^{[m]}=\gamma_{S2}\cdot\Delta\overline{S}^{[m-1]}+(1-\gamma_{S2})\cdot\Delta S^{[m]}$$

Here, $\gamma_{S2}$ is a constant number. However, $$\gamma_{S2}\leqq\gamma_{S1}$$

and for example, $\gamma_{S2}$=0.64.

Next, a case of the second change quantities will be explained.

After the second change quantities are calculated at Step B3, it is confirmed whether or not the past determination flag is 1 (Step B11).

If the determination flag is 1, filter processing like the seventh filter in the second embodiment is conducted, and the second average change quantity is calculated (Step B12). For example, by using a smoothing filter of the following equation, from the second change quantities $\Delta E_f^{[m]}$ in the m-th frame and the second average change quantity $$\Delta\overline{E}_f^{[m-1]}$$

in the (m−1)-th frame, the second average change quantity $$\Delta\overline{E}_f^{[m]}$$

in the m-th frame is calculated.

$$\Delta\overline{E}_f^{[m]}=\gamma_{Ef1}\cdot\Delta\overline{E}_f^{[m-1]}+(1-\gamma_{Ef1})\cdot\Delta E_f^{[m]}$$

Here, $\gamma_{Ef1}$ is a constant number, and for example, $\gamma_{Ef1}$=0.70.

On the other hand, if the determination flag is 0, filter processing like the eighth filter in the second embodiment is conducted, and the second average change quantity is calculated (Step B13). For example, by using a smoothing filter of the following equation, from the second change quantities $\Delta E_f^{[m]}$ in the m-th frame and the second average change quantity $$\Delta\overline{E}_f^{[m-1]}$$

in the (m−1)-th frame, the second average change quantity $$\Delta\overline{E}_f^{[m]}$$

in the m-th frame is calculated.

$$\Delta\overline{E}_f^{[m]}=\gamma_{Ef2}\cdot\Delta\overline{E}_f^{[m-1]}+(1-\gamma_{Ef2})\cdot\Delta E_f^{[m]}$$

Here, $\gamma_{Ef2}$ is a constant number. However, $$\gamma_{Ef2}\leqq\gamma_{Ef1}$$

and for example, $\gamma_{Ef2}$=0.54.

Subsequently, a case of the third change quantities will be explained.

After the third change quantities are calculated at Step C3, it is confirmed whether or not the past determination flag is 1 (Step C11).

If the determination flag is 1, filter processing like the ninth filter in the second embodiment is conducted, and the third average change quantity is calculated (Step C12). For example, by using a smoothing filter of the following equation, from the third change quantities $\Delta E_l^{[m]}$ in the m-th frame and the third average change quantity $$\Delta\bar{E}_l^{[m-1]}$$

in the (m−1)-th frame, the third average change quantity $$\Delta\bar{E}_l^{[m]}$$

in the m-th frame is calculated.

$$\Delta\bar{E}_l^{[m]}=\gamma_{El1}\cdot\Delta\bar{E}_l^{[m-1]}+(1-\gamma_{El1})\cdot\Delta E_l^{[m]}$$

Here, $\gamma_{El1}$ is a constant number, and for example, $\gamma_{El1}=0.70$.

On the other hand, if the determination flag is 0, filter processing like the tenth filter in the second embodiment is conducted, and the third average change quantity is calculated (Step C13). For example, by using a smoothing filter of the following equation, from the third change quantities $\Delta E_l^{[m]}$ in the m-th frame and the third average change quantity $$\Delta\bar{E}_l^{[m-1]}$$

in the (m−1)-th frame, the third average change quantity $$\Delta\bar{E}_l^{[m]}$$

in the m-th frame is calculated.

$$\Delta\bar{E}_l^{[m]}=\gamma_{El2}\cdot\Delta\bar{E}_l^{[m-1]}+(1-\gamma_{El2})\cdot\Delta E_l^{[m]}$$

Here, $\gamma_{El2}$ is a constant number. However, $$\gamma_{El2}\leqq\gamma_{El1}$$

and for example, $\gamma_{El2}=0.54$.

Further, a case of the fourth change quantities will be explained.

After the fourth change quantities are calculated at Step D3, it is confirmed whether or not the past determination flag is 1 (Step D11).

If the determination flag is 1, filter processing like the eleventh filter in the second embodiment is conducted, and the fourth average change quantity is calculated (Step D12). For example, by using a smoothing filter of the following equation, from the fourth change quantities $\Delta Z_c^{[m]}$ in the m-th frame and the fourth average change quantity $$\Delta\bar{Z}_c^{[m-1]}$$

in the (m−1)-th frame, the fourth average change A quantity $$\Delta\bar{Z}_c^{[m]}$$

in the m-th frame is calculated.

$$\Delta\bar{Z}_c^{[m]}=\gamma_{Zc1}\cdot\Delta\bar{Z}_c^{[m-1]}+(1-\gamma_{Zc1})\cdot\Delta Z_c^{[m]}$$

Here, $\gamma_{Zc1}$ is a constant number, and for example, $\gamma_{Zc1}=0.78$.

On the other hand, if the determination flag is 0, filter processing like the twelfth filter in the second embodiment is conducted, and the fourth average change quantity is calculated (Step D13). For example, by using a smoothing filter of the following equation, from the fourth change quantities $\Delta Z_c^{[m]}$ in the m-th frame and the fourth average change quantity $$\Delta\bar{Z}_c^{[m-1]}$$

in the (m−1)-th frame, the fourth average change quantity $$\Delta\bar{Z}_c^{[m]}$$

in the m-th frame is calculated.

$$\Delta\bar{Z}_c^{[m]}=\gamma_{Zc2}\cdot\Delta\bar{Z}_c^{[m-1]}+(1-\gamma_{Zc2})\cdot\Delta Z_c^{[m]}$$

Here, $\gamma_{Zc2}$ is a constant number. However, $$\gamma_{Zc2}\leqq\gamma_{Zc1}$$

and for example, $\gamma_{Zc2}=0.64$.

And, when a four-dimensional vector consisting of the above-described first average change quantity $$\Delta\bar{S}^{[m]}$$

the above-described second average change quantity $$\Delta\bar{E}_f^{[m]}$$

the above-described third average change quantity $$\Delta\bar{E}_l^{[m]}$$

and the above-described fourth average change quantity $$\Delta\bar{Z}_c^{[m]}$$

exists within a voice region in a four-dimensional space, it is determined that it is the voice section, and otherwise, it is determined that it is the non-voice section (Step E1).

Figure 11:
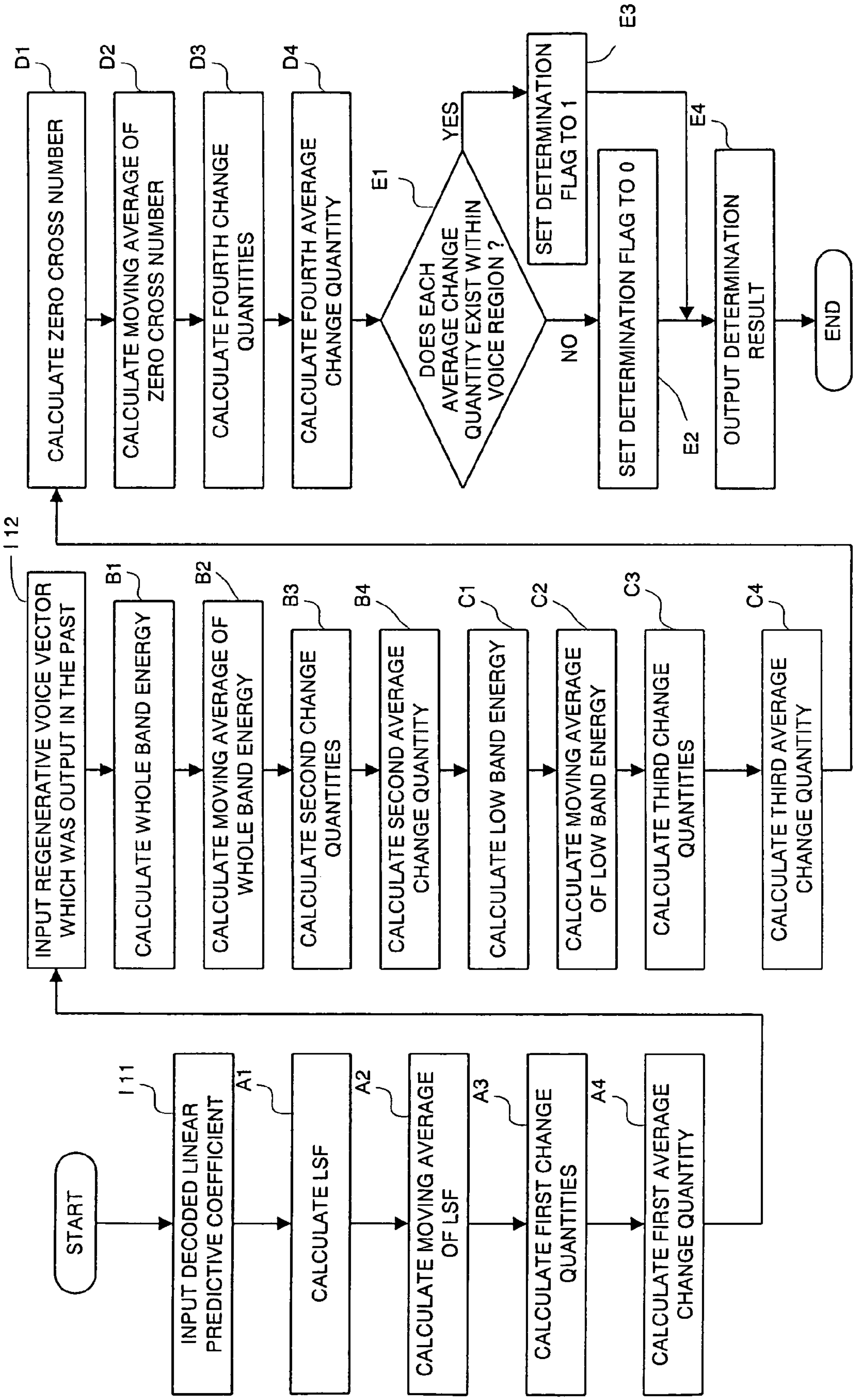
FIG. 11 is a flowchart for explaining an operation of the embodiment of the present invention.

Subsequently, an operation of processing corresponding to the above-mentioned third embodiment will be explained using a flowchart. FIG. 11 is a flowchart for explaining the operation corresponding to the third embodiment.

Points in this operation, which are different from the above-mentioned processing, are Step I11 and Step I12, and are that a linear predictive coefficient decoded in a voice decoding device is input at Step I11, and that a regenerative voice vector output from the voice decoding device in the past is input at Step I12.

Since processing other than these is the same as the processing having the above-mentioned operation, explanation thereof will be omitted.

Figure 12:
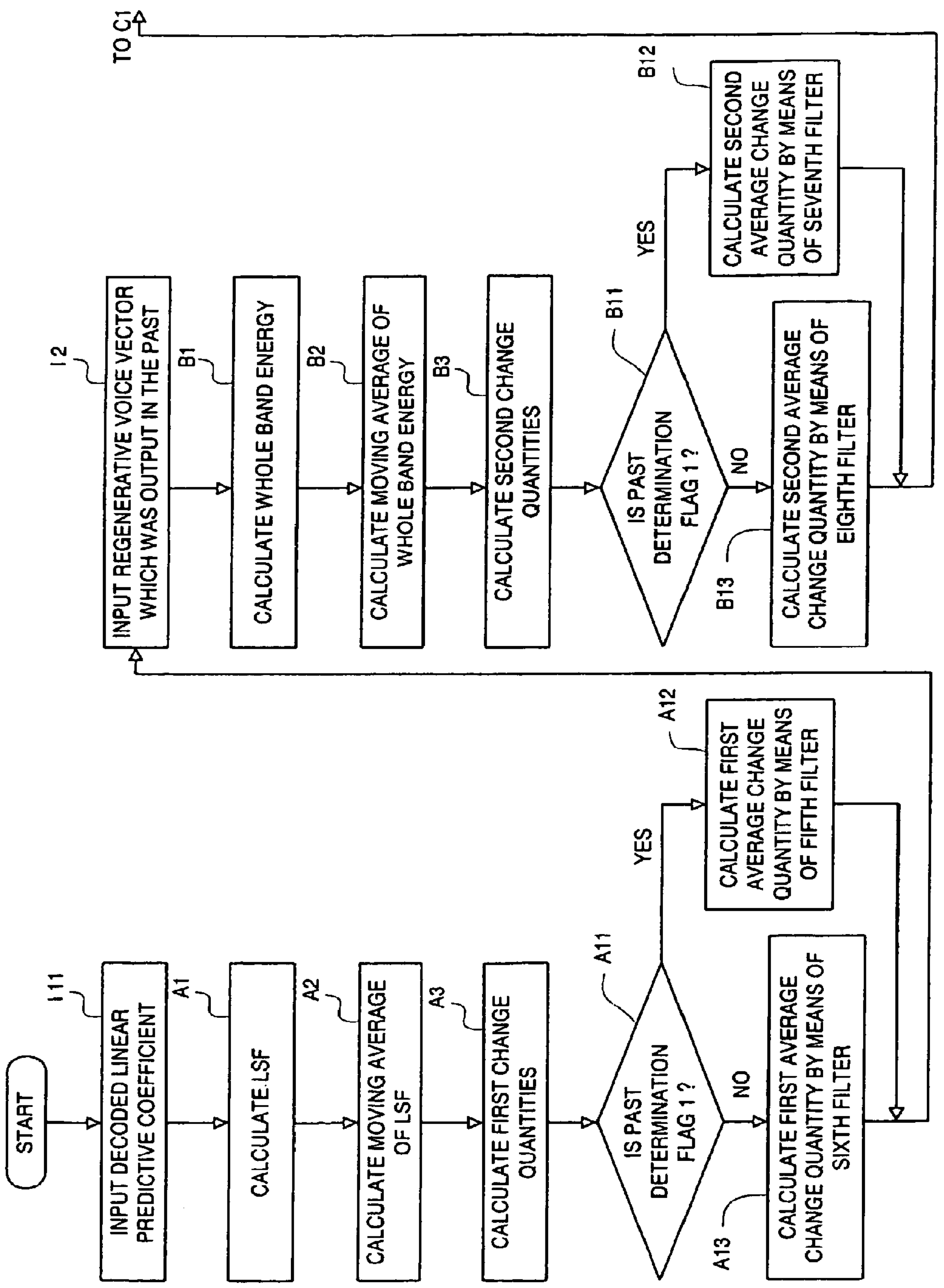
FIG. 12 is a flowchart for explaining an operation of the embodiment of the present invention.
Figure 13:
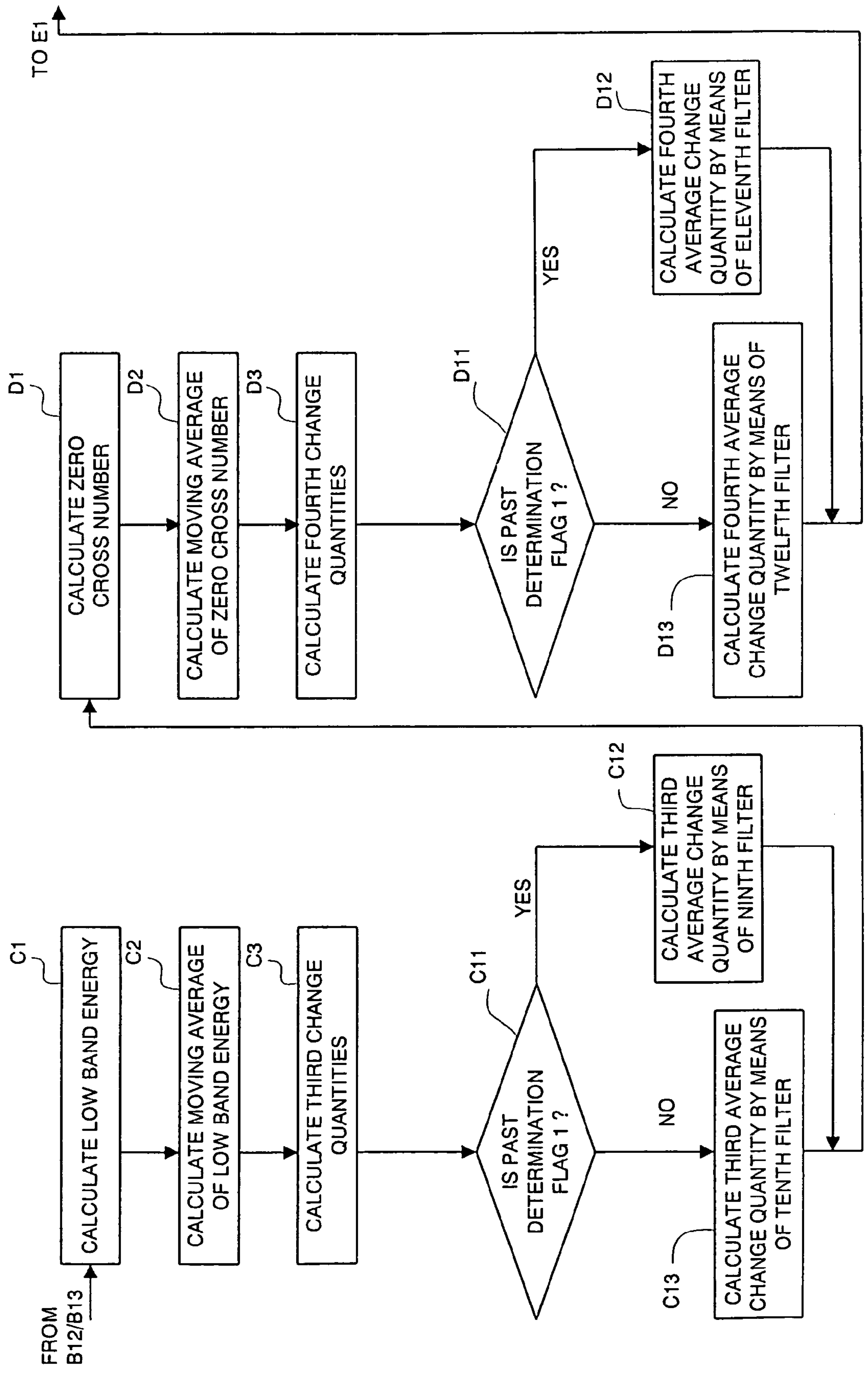
FIG. 13 is a flowchart for explaining an operation of the embodiment of the present invention.
Figure 14:
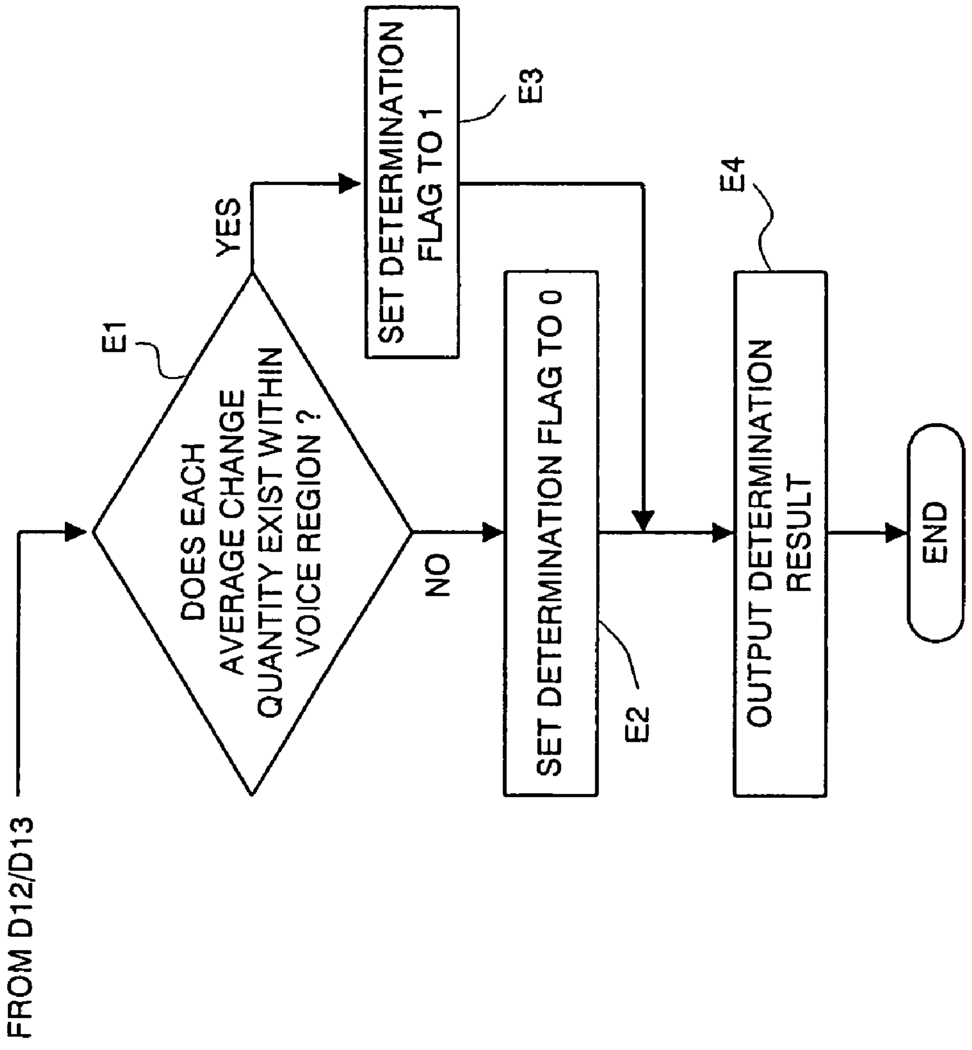
FIG. 14 is a flowchart for explaining an operation of the embodiment of the present invention.

Finally, an operation of processing corresponding to the above-mentioned fourth embodiment will be explained using a flowchart. FIG. 12, FIG. 13 and FIG. 14 are flowcharts for explaining the operation corresponding to the fourth embodiment.

This operation is characterized in that the operation corresponding to the above-mentioned second embodiment and the operation corresponding to the above-mentioned third embodiment are combined with each other. Accordingly, since the operation corresponding to the second embodiment and the operation corresponding to the third embodiment were already explained, explanation thereof will be omitted.

The effect of the present invention is that it is possible to reduce a detection error in the voice section and a detection error in the non-voice section.

The reason thereof is that the voice/non-voice determination is conducted by using the long-time averages of the spectral change quantities, the energy change quantities and the zero cross number change quantities. In other words, since, with regard to the long-time average of each of the above-described change quantities, a change of a value within each section of voice and non-voice is smaller compared with each of the above-described change quantities themselves, values of the above-described long-time averages exist with a high rate within a value range predetermined in accordance with the voice section and the non-voice section.

What is claimed is:

1. A voice detecting method discriminating a voice section from a non-voice section for every fixed time length for a voice signal comprising the steps of:

(a) calculating a feature quantity from said voice signal input by a feature quantity calculating circuit;

(b) calculating a change quantity from said feature quantity by a change quantity calculating circuit, said change quantity corresponds to a variation in time of said feature quantity;

(c) inputting the change quantity to one or more filters;

(d) discriminating the voice section from the non-voice section by a determining circuit, using a long-time average of said change quantity, said long-time average of said change quantity is obtained by said one or more filters; and (e) repeating steps (a)-(d) for every fixed time length in the voice signal, wherein the change quantity of said feature quantity is calculated by using said feature quantity and a said long-time average thereof.

2. A voice detecting method recited in claim 1, wherein the feature quantity calculated from the voice signal input in the past is used.

3. A voice detecting method recited in claim 1, wherein at least one of a line spectral frequency, a whole band energy, a low band energy and a zero cross number is used for said feature quantity.

4. A voice detecting method recited in claim 1 wherein at least one of a line spectral frequency, a whole band energy, and a low band energy is used for said feature quantity.

5. A voice detecting method discriminating a voice section from a non-voice section for every fixed time length for a voice signal comprising the steps of:

(a) calculating a feature quantity from said voice signal input by a feature quantity calculating circuit;

(b) calculating a change quantity from said feature quantity by a change quantity calculating circuit, said change quantity corresponds to a variation in time of said feature quantity;

(c) inputting the change quantity to one or more filters;

(d) discriminating the voice section from the non-voice section by a determining circuit, using a long-time average of said change quantity, said long-time average of said change quantity is obtained by said one or more filters; and (e) repeating steps (a)-(d) for every fixed time length in the voice signal, wherein said one or more filters are switched to each other when the long-time average of said change quantity is calculated, using a result of discrimination output in the past.

6. A voice detecting apparatus for discriminating a voice section from a non-voice section for a voice signal, using a feature quality calculated from said voice signal, said apparatus comprising:

a feature quantity calculating circuit for calculating said feature quantity from said voice signal;

a change quantity calculating circuit for calculating a change quantity of said feature quantity by using said feature quantity and a long-time average thereof;

filters for calculating a long-time average of said change quantity;

a voice/non-voice determining circuit for discriminating said voice section from said non-voice section using said long-time average of said change quantity; and a switch for switching between said filters for calculating the long-time average of said change quantity, based upon a result of the discrimination.

7. A voice detecting apparatus recited in claim 6, wherein said feature quantity calculating circuit includes any one of:

(a) an LSF calculating circuit for calculating a line spectral frequency (LSF) from the voice signal, a line spectral frequency change quantity calculating section for calculating first change quantities of said line spectral frequency, a first filter for calculating a long-time average of said first change quantities;

(b) a whole band energy calculating circuit for calculating a whole band energy from said voice signal, a whole band energy change quantity calculating section for calculating second change quantities of said whole band energy, a second filter for calculating a long-time average of said second change quantities;

(c) a low band energy calculating circuit for calculating a low band energy from said voice signal, a low band energy change quantity calculating section for calculating third change quantities of said low band energy, a third filter for calculating a long-time average of said third change quantities; or (d) a zero cross number calculating circuit for calculating a zero cross number from said voice signal, a zero cross number change quantity calculating section for calculating fourth change quantities of said zero cross number, a fourth filter for calculating a long-time average of said fourth change quantities.

8. A voice detecting apparatus recited in claim 6, wherein said feature quantity calculating circuit includes any one of:

(a) an LSF calculating circuit for calculating a line spectral frequency (LSF) from the voice signal, a first change quantity calculating section for calculating first change quantities based on a difference between said line spectral frequency and a long-time average thereof, a first filter for calculating a long-time average of said first change quantities;

(b) a whole band energy calculating circuit for calculating a whole band energy from said voice signal, a second change quantity calculating section for calculating second change quantities based on a difference between said whole band energy and a long-time average thereof, a second filter for calculating a long-time average of said second change quantities;

(c) a low band energy calculating circuit for calculating a low band energy from said voice signal, a third change quantity calculating section for calculating third change quantities based on a difference between said low band energy and a long-time average thereof, a third filter for calculating a long-time average of said third change quantities; or (d) a zero cross number calculating circuit for calculating a zero cross number from said voice signal, a fourth change quantity calculating section for calculating fourth change quantities based on a difference between said zero cross number and a long-time average thereof; a fourth filter for calculating a long-time average of said fourth change quantities.

9. A recording medium readable by an information processing device constituting a voice detecting apparatus for discriminating a voice section from a non-voice section for every fixed time length for a voice signal, using feature quantity calculated from said voice signal input for every fixed time length, in which a program is recorded for making said information processing device execute:

(a) a process of calculating a feature quantity from said voice signal input by a feature quantity calculating circuit;

(b) a process of calculating a change quantity from said feature quantity by a change quantity calculating circuit, said change quantity corresponds to a variation in time of said feature quantity;

(c) a process of inputting the change quantity to one or more filters;

(d) a process of discriminating the voice section from the non-voice section by a determining circuit, using a long-time average of said change quantity, said long-time average of said change quantity is obtained by said one or more filters; and (e) a process of repeating steps (a)-(d) for every fixed time length in the voice signal, wherein the change quantity of said feature quantity is calculated by using said feature quantity and a said long-time average thereof, wherein the process of calculating a feature quantity is one of the following groups of processes:

(a) a process of calculating a line spectral frequency (LSF) from said voice signal, a process of calculating first change quantities of said line spectral frequency, a process of calculating a long-time average of said first change quantities;

(b) a process of calculating a whole band energy from said voice signal, a process of calculating second change quantities of said whole band energy; a process of calculating a long-time average of said second change quantities;

(c) a process of calculating a low band energy from said voice signal; a process of calculating third change quantities of said low band energy; a process of calculating a long-time average of said third change quantities; or (d) a process of calculating a zero cross number from said voice signal; a process of calculating fourth change quantities of said zero cross number; a process of calculating a long-time average of said fourth change quantities.

10. A recording medium readable by an information processing device constituting a voice detecting apparatus for discriminating a voice section from a non-voice section for every fixed time length for a voice signal, using feature quantity calculated from said voice signal input for every fixed time length, in which a program is recorded for making said information processing device execute:

(a) a process of calculating a feature quantity from said voice signal input by a feature quantity calculating circuit:

(b) a process of calculating a change quantity from said feature quantity by a change quantity calculating circuit, said change quantity corresponds to a variation in time of said feature quantity;

(c) a process of inputting the change quantity to one or more filters;

(d) a process of discriminating the voice section from the non-voice section by a determining circuit, using a long-time average of said change quantity, said long-time average of said change quantity is obtained by said one or more filters; and (e) a process of repeating steps (a)-(d) for every fixed time length in the voice signal, wherein the change quantity of said feature quantity is calculated by using said feature quantity and a said long-time average thereof, wherein the process of calculating a feature quantity is one of the following groups of processes:

(a) a process of calculating a line spectral frequency (LSF) from said voice signal; a process of calculating first change quantities based on a difference between said line spectral frequency and a long-time average thereof, a process of calculating a long-time average of said first change quantities;

(b) a process of calculating a whole band energy from said voice signal; a process of calculating second change quantities based on a difference between said whole band energy and a long-time average thereof; a process of calculating a long-time average of said second change quantities;

(c) a process of calculating a low band energy from said voice signal; a process of calculating third change quantities based on a difference between said low band energy and a long-time average thereof; a process of calculating a long-time average of said third change quantities; or (d) a process of calculating a zero cross number from said voice signal; a process of calculating fourth change quantities based on a difference between said zero cross number and a long-time average thereof; a process of calculating a long-time average of said fourth change quantities.

* * * * *